United States Patent
Cooper et al.

(10) Patent No.: US 11,503,314 B2
(45) Date of Patent: Nov. 15, 2022

(54) SYSTEMS AND METHODS FOR REGION-OF-INTEREST TONE REMAPPING

(71) Applicant: INTERDIGITAL MADISON PATENT HOLDINGS, SAS, Paris (FR)

(72) Inventors: Jeffrey Allen Cooper, Rocky Hill, NJ (US); Kumar Ramaswamy, Princeton, NJ (US); Ralph Neff, San Diego, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 16/314,846

(22) PCT Filed: Jul. 7, 2017

(86) PCT No.: PCT/US2017/041142
§ 371 (c)(1),
(2) Date: Jan. 2, 2019

(87) PCT Pub. No.: WO2018/009828
PCT Pub. Date: Jan. 11, 2018

(65) Prior Publication Data
US 2019/0320189 A1    Oct. 17, 2019

Related U.S. Application Data

(60) Provisional application No. 62/365,863, filed on Jul. 22, 2016, provisional application No. 62/360,105, filed on Jul. 8, 2016.

(51) Int. Cl.
*H04N 19/20* (2014.01)
*H04N 19/115* (2014.01)
(Continued)

(52) U.S. Cl.
CPC .......... *H04N 19/20* (2014.11); *H04N 19/115* (2014.11); *H04N 19/162* (2014.11);
(Continued)

(58) Field of Classification Search
CPC .... H04N 19/20; H04N 19/115; H04N 19/162; H04N 19/167; H04N 19/182; H04N 19/70; H04N 21/23439; H04N 21/4728
See application file for complete search history.

(56) References Cited

U.S. PATENT DOCUMENTS

| | | |
|---|---|---|
| 5,610,653 A | 3/1997 | Abecassis |
| 5,892,554 A | 4/1999 | DiCicco |

(Continued)

FOREIGN PATENT DOCUMENTS

| | | |
|---|---|---|
| CA | 2936318 | 8/2015 |
| CN | 101313578 A | 11/2008 |

(Continued)

OTHER PUBLICATIONS

Loungev Films, "HD 1080p—Nature Scenery Video". YouTube link available at: www.youtube.com/watch?v=DQuhA5ZCV9M, published on Jan. 13, 2016, 3 pages.

(Continued)

*Primary Examiner* — Michael A Keller
(74) *Attorney, Agent, or Firm* — Smadar Gefen

(57) ABSTRACT

Systems and methods are described for providing viewers of adaptive bit rate (ABR) streaming video with the option to view alternative streams in which an alternative tone mapping is applied to one or more regions of interest. The availability of streams with alternative tone mappings may be identified in a media presentation description (MPD) in an MPEG-DASH system. In some embodiments, the streaming video is divided into slices, and alternative tone mappings are applied to regions of interest within the slices.

(Continued)

When a server receives a request from a client device for alternative tone mappings of different regions, slices with the appropriate mapping may be assembled on demand and delivered to the requestor as a single video stream. Tone mappings may be used, for example, to highlight particular players in a sporting event.

20 Claims, 17 Drawing Sheets

(51) Int. Cl.
    *H04N 19/162*    (2014.01)
    *H04N 19/167*    (2014.01)
    *H04N 19/182*    (2014.01)
    *H04N 19/70*     (2014.01)
    *H04N 21/2343*   (2011.01)
    *H04N 21/4728*   (2011.01)

(52) U.S. Cl.
    CPC ......... *H04N 19/167* (2014.11); *H04N 19/182* (2014.11); *H04N 19/70* (2014.11); *H04N 21/23439* (2013.01); *H04N 21/4728* (2013.01)

(56) References Cited

U.S. PATENT DOCUMENTS

| | | |
|---|---|---|
| 6,282,713 B1 | 8/2001 | Kitsukawa |
| 6,750,919 B1 | 6/2004 | Rosser |
| 6,973,130 B1 | 12/2005 | Wee |
| 7,079,176 B1 | 7/2006 | Freeman |
| 7,114,174 B1 | 9/2006 | Brooks |
| 7,117,517 B1 | 10/2006 | Milazzo |
| 7,343,617 B1 | 3/2008 | Katcher |
| 7,577,980 B2 | 8/2009 | Kienzle |
| 7,782,344 B2 | 8/2010 | Whittaker |
| 7,949,032 B1 | 5/2011 | Frost |
| 8,055,785 B2 | 11/2011 | Liu |
| 8,160,077 B2 | 4/2012 | Traversat |
| 8,243,797 B2 | 8/2012 | Lin |
| 8,331,760 B2 | 12/2012 | Butcher |
| 8,621,000 B2 | 12/2013 | Adimatyam |
| 8,705,527 B1 | 4/2014 | Addepalli |
| 9,047,236 B2 | 6/2015 | Gigliotti |
| 9,060,187 B2 | 6/2015 | Wu |
| 9,064,313 B2 | 6/2015 | Seshadrinathan |
| 9,137,027 B2 | 9/2015 | Matthews |
| 9,137,558 B2 | 9/2015 | Gibbon |
| 9,170,707 B1 | 10/2015 | Laska |
| 9,177,225 B1 | 11/2015 | Cordova-Diba |
| 9,218,641 B1 * | 12/2015 | Ellis ............ H04N 7/005 |
| 9,231,838 B2 | 1/2016 | Ould-Brahim |
| 9,288,545 B2 | 3/2016 | Hill |
| 9,317,688 B2 | 4/2016 | Yegin |
| 9,336,060 B2 | 5/2016 | Nori |
| 9,344,888 B2 | 5/2016 | Starsinic |
| 9,380,623 B2 | 6/2016 | Kim |
| 9,515,372 B2 | 12/2016 | Chang |
| 9,992,553 B2 | 6/2018 | Bennett |
| 10,152,826 B2 | 12/2018 | Saito |
| 2002/0056136 A1 | 5/2002 | Wistendahl |
| 2002/0059588 A1 | 5/2002 | Huber |
| 2002/0065678 A1 | 5/2002 | Peliotis |
| 2002/0120931 A1 | 8/2002 | Huber |
| 2002/0120934 A1 | 8/2002 | Abrahams |
| 2002/0126990 A1 | 9/2002 | Rasmussen |
| 2002/0131511 A1 | 9/2002 | Zenoni |
| 2002/0133817 A1 | 9/2002 | Markel |
| 2002/0147987 A1 | 10/2002 | Reynolds |
| 2002/0174425 A1 | 11/2002 | Markel |
| 2003/0028873 A1 | 2/2003 | Lemmons |
| 2003/0149983 A1 | 8/2003 | Markel |
| 2004/0031062 A1 | 2/2004 | Lemmons |
| 2004/0032495 A1 | 2/2004 | Ortiz |
| 2004/0190779 A1 | 9/2004 | Sarachik |
| 2005/0093976 A1 | 5/2005 | Valleriano |
| 2005/0286466 A1 | 12/2005 | Tagg |
| 2006/0193295 A1 | 8/2006 | White |
| 2007/0024706 A1 | 2/2007 | Brannon, Jr. |
| 2007/0042784 A1 | 2/2007 | Anderson |
| 2007/0077943 A1 | 4/2007 | Hamilla |
| 2007/0086669 A1 | 4/2007 | Berger |
| 2007/0101418 A1 | 5/2007 | Wood |
| 2007/0104369 A1 | 5/2007 | Weatherhead |
| 2007/0153739 A1 | 7/2007 | Zheng |
| 2007/0171921 A1 | 7/2007 | Wookey |
| 2007/0226761 A1 | 9/2007 | Zalewski |
| 2008/0077965 A1 | 3/2008 | Kamimaki |
| 2008/0127253 A1 | 5/2008 | Zhang |
| 2008/0134305 A1 | 6/2008 | Hinton |
| 2008/0225116 A1 | 9/2008 | Kang |
| 2008/0261711 A1 | 10/2008 | Tuxen |
| 2009/0002564 A1 * | 1/2009 | Barnhoefer ......... G09G 3/3406 348/687 |
| 2009/0003718 A1 * | 1/2009 | Liu ................. H04N 19/102 382/238 |
| 2009/0007023 A1 | 1/2009 | Sundstrom |
| 2009/0046152 A1 | 2/2009 | Aman |
| 2009/0047902 A1 | 2/2009 | Nory |
| 2009/0201917 A1 | 8/2009 | Maes |
| 2009/0217339 A1 | 8/2009 | Kim |
| 2009/0220080 A1 | 9/2009 | Herne |
| 2009/0225164 A1 | 9/2009 | Renkis |
| 2009/0276805 A1 | 11/2009 | Andrews, II |
| 2009/0300692 A1 | 12/2009 | Mavlankar |
| 2009/0305708 A1 | 12/2009 | Matsui |
| 2009/0316795 A1 | 12/2009 | Chui |
| 2009/0322489 A1 | 12/2009 | Jones |
| 2010/0097221 A1 | 4/2010 | Kreiner |
| 2010/0188531 A1 * | 7/2010 | Cordes ................ G06T 5/20 348/235 |
| 2010/0232504 A1 | 9/2010 | Feng |
| 2010/0321389 A1 | 12/2010 | Gay |
| 2011/0013836 A1 | 1/2011 | Gefen |
| 2011/0016321 A1 | 1/2011 | Sundaram |
| 2011/0113480 A1 | 5/2011 | Ma |
| 2011/0145430 A1 | 6/2011 | Ha |
| 2011/0231653 A1 | 9/2011 | Bollay |
| 2011/0299832 A1 | 12/2011 | Butcher |
| 2011/0304772 A1 | 12/2011 | Dasher |
| 2012/0030637 A1 | 2/2012 | Dey |
| 2012/0047551 A1 | 2/2012 | Pattar |
| 2012/0062732 A1 | 3/2012 | Marman |
| 2012/0072952 A1 | 3/2012 | Vaysman |
| 2012/0078712 A1 | 3/2012 | Fontana |
| 2012/0117140 A1 | 5/2012 | Wang |
| 2012/0195574 A1 | 8/2012 | Wallace |
| 2013/0003576 A1 | 1/2013 | Segura |
| 2013/0016910 A1 | 1/2013 | Murata |
| 2013/0031582 A1 | 1/2013 | Tinsman |
| 2013/0036442 A1 | 2/2013 | Wingert |
| 2013/0050268 A1 | 2/2013 | Lohrenz |
| 2013/0061262 A1 | 3/2013 | Briggs |
| 2013/0065622 A1 | 3/2013 | Hwang |
| 2013/0091430 A1 | 4/2013 | Zhai |
| 2013/0091515 A1 | 4/2013 | Sakata |
| 2013/0142118 A1 | 6/2013 | Cherian |
| 2013/0155106 A1 | 6/2013 | Rolleston |
| 2013/0155847 A1 | 6/2013 | Li |
| 2013/0163507 A1 | 6/2013 | Hoshino |
| 2013/0167062 A1 | 6/2013 | Herring |
| 2013/0188503 A1 | 7/2013 | Anepu |
| 2013/0188515 A1 | 7/2013 | Pinheiro |
| 2013/0223339 A1 | 8/2013 | Nakahara |
| 2013/0246784 A1 | 9/2013 | Zhang |
| 2013/0312042 A1 | 11/2013 | Venson |
| 2013/0336305 A1 | 12/2013 | Yan |
| 2013/0342539 A1 | 12/2013 | Khan |
| 2014/0022074 A1 | 1/2014 | Balinski |
| 2014/0026052 A1 | 1/2014 | Thorwirth |
| 2014/0029462 A1 | 1/2014 | Stewart |
| 2014/0033074 A1 | 1/2014 | Thibaux |
| 2014/0045452 A1 | 2/2014 | Ma |

(56) References Cited

U.S. PATENT DOCUMENTS

| | | |
|---|---|---|
| 2014/0059457 A1 | 2/2014 | Min |
| 2014/0082054 A1 | 3/2014 | Denoual |
| 2014/0086217 A1 | 3/2014 | Park |
| 2014/0089990 A1 | 3/2014 | Van Deventer |
| 2014/0168056 A1 | 6/2014 | Swaminathan |
| 2014/0192204 A1 | 7/2014 | Glazer |
| 2014/0195918 A1 | 7/2014 | Friedlander |
| 2014/0204206 A1 | 7/2014 | Itoi |
| 2014/0204247 A1 | 7/2014 | Bilgen |
| 2014/0210714 A1 | 7/2014 | Kang |
| 2014/0215043 A1 | 7/2014 | Ryu |
| 2014/0245367 A1 | 8/2014 | Sasaki |
| 2014/0269581 A1 | 9/2014 | Song |
| 2014/0269932 A1 | 9/2014 | Su |
| 2014/0279068 A1 | 9/2014 | Systrom |
| 2014/0280781 A1 | 9/2014 | Gregotski |
| 2014/0282751 A1 | 9/2014 | Lee |
| 2014/0282909 A1 | 9/2014 | Cherian |
| 2015/0016504 A1* | 1/2015 | Auyeung ............ H04N 19/162 375/240.02 |
| 2015/0032901 A1 | 1/2015 | Wang |
| 2015/0033312 A1 | 1/2015 | Seed |
| 2015/0062339 A1 | 3/2015 | Ostrom |
| 2015/0070587 A1 | 3/2015 | Emeott |
| 2015/0089023 A1 | 3/2015 | Phillips |
| 2015/0089072 A1 | 3/2015 | Phillips |
| 2015/0104155 A1 | 4/2015 | Bloch |
| 2015/0117229 A1* | 4/2015 | Avudainayagam ... H04L 5/0048 370/252 |
| 2015/0145782 A1 | 5/2015 | Brown |
| 2015/0172775 A1 | 6/2015 | Yee |
| 2015/0179219 A1 | 6/2015 | Gao |
| 2015/0201222 A1* | 7/2015 | Mertens ............. H04N 19/196 382/233 |
| 2015/0208103 A1 | 7/2015 | Guntur |
| 2015/0222815 A1 | 8/2015 | Wang |
| 2015/0264096 A1 | 9/2015 | Swaminathan |
| 2015/0268822 A1 | 9/2015 | Waggoner |
| 2015/0296250 A1 | 10/2015 | Casper |
| 2015/0341091 A1 | 11/2015 | Park |
| 2015/0348247 A1 | 12/2015 | McLaughlin |
| 2015/0350659 A1 | 12/2015 | Auyeung |
| 2015/0382268 A1 | 12/2015 | Hampel |
| 2016/0042496 A1 | 2/2016 | Ichimi |
| 2016/0057494 A1 | 2/2016 | Hwang |
| 2016/0073106 A1 | 3/2016 | Su |
| 2016/0156949 A1 | 6/2016 | Hattori |
| 2016/0165309 A1* | 6/2016 | Van Brandenburg ........................ H04N 21/64322 725/116 |
| 2016/0182593 A1 | 6/2016 | Denoual |
| 2016/0192433 A1 | 6/2016 | Deenoo |
| 2016/0217623 A1 | 7/2016 | Singh |
| 2016/0249269 A1 | 8/2016 | Niu |
| 2016/0249353 A1 | 8/2016 | Nakata |
| 2016/0253240 A1 | 9/2016 | Cocagne |
| 2016/0269771 A1 | 9/2016 | Bangma |
| 2016/0306036 A1 | 10/2016 | Johnson |
| 2016/0360172 A1* | 12/2016 | Tao .................... H04N 9/68 |
| 2016/0360235 A1 | 12/2016 | Ramasubramonian |
| 2016/0364087 A1 | 12/2016 | Thompson |
| 2016/0366454 A1 | 12/2016 | Tatourian |
| 2017/0070735 A1 | 3/2017 | Ramasubramonian |
| 2017/0118540 A1* | 4/2017 | Thomas ............. H04N 19/167 |
| 2017/0136948 A1 | 5/2017 | Sypitkowski |
| 2017/0212583 A1 | 7/2017 | Krasadakis |
| 2017/0236288 A1 | 8/2017 | Sundaresan |
| 2017/0302719 A1 | 10/2017 | Chen |
| 2018/0098063 A1 | 4/2018 | Chen |
| 2018/0332632 A1 | 11/2018 | Vikberg |
| 2018/0343043 A1 | 11/2018 | Hakola |
| 2019/0036910 A1 | 1/2019 | Choyi |
| 2019/0320189 A1 | 10/2019 | Cooper |
| 2020/0014961 A1 | 1/2020 | Ramaswamy |
| 2021/0130629 A1 | 5/2021 | Suzuki |

FOREIGN PATENT DOCUMENTS

| | | |
|---|---|---|
| CN | 101331735 A | 12/2008 |
| CN | 101350923 A | 1/2009 |
| CN | 102238547 A | 11/2011 |
| CN | 102752877 A | 10/2012 |
| CN | 102907068 A | 1/2013 |
| CN | 102939573 A | 2/2013 |
| CN | 103190089 A | 7/2013 |
| CN | 103336663 A | 10/2013 |
| CN | 104012106 A | 8/2014 |
| CN | 104052788 A | 9/2014 |
| CN | 104092488 A | 10/2014 |
| CN | 104220975 A | 12/2014 |
| CN | 105144727 A | 12/2015 |
| CN | 105264904 A | 1/2016 |
| CN | 105373331 A | 3/2016 |
| CN | 106233745 A | 12/2016 |
| EP | 1175785 A1 | 1/2002 |
| EP | 1443768 A1 | 8/2004 |
| EP | 2426645 A1 | 3/2012 |
| EP | 2530675 A2 | 12/2012 |
| EP | 2824883 A1 | 1/2015 |
| EP | 2824885 | 1/2015 |
| EP | 2882110 A1 | 6/2015 |
| EP | 2919471 | 9/2015 |
| EP | 3076672 A1 | 10/2016 |
| EP | 3110160 A1 | 12/2016 |
| EP | 2408196 | 1/2017 |
| JP | 2004104351 A | 4/2004 |
| JP | 2009207114 | 9/2009 |
| JP | 2013522965 A | 6/2013 |
| JP | 2014525191 A | 9/2014 |
| JP | 2014530534 A | 11/2014 |
| JP | 3313503 B1 | 4/2018 |
| KR | 20080041237 A | 5/2008 |
| KR | 20100065327 A | 6/2010 |
| KR | 20140043532 A | 4/2014 |
| KR | 20140098156 A | 8/2014 |
| KR | 20160021141 A | 2/2016 |
| KR | 20170128515 A | 11/2017 |
| WO | 2001018658 A1 | 3/2001 |
| WO | 2010021705 | 2/2010 |
| WO | 2010021705 A1 | 2/2010 |
| WO | 2011082150 A1 | 7/2011 |
| WO | 2012021246 | 2/2012 |
| WO | 2012114666 A1 | 8/2012 |
| WO | 2012141557 A2 | 10/2012 |
| WO | 2013142966 A1 | 10/2013 |
| WO | 2014057131 | 4/2014 |
| WO | 2014067566 | 5/2014 |
| WO | 2014111423 A1 | 7/2014 |
| WO | 2014183803 A1 | 11/2014 |
| WO | 2014190308 A1 | 11/2014 |
| WO | 2015013645 A1 | 1/2015 |
| WO | 2015013685 A1 | 1/2015 |
| WO | 2015014773 A1 | 2/2015 |
| WO | 2015059194 A1 | 4/2015 |
| WO | 2015122737 A1 | 8/2015 |
| WO | 2015130796 | 9/2015 |
| WO | 2015197815 | 12/2015 |
| WO | 2015197815 A1 | 12/2015 |
| WO | 2016040290 A1 | 3/2016 |
| WO | 2016040833 A1 | 3/2016 |
| WO | 2016098056 A1 | 6/2016 |
| WO | 2017061297 | 4/2017 |
| WO | 2017196670 A1 | 11/2017 |

OTHER PUBLICATIONS

Flowplayer—"Bandwidth Detection". Web Archived dated Dec. 24, 2016. Retrieved from http://web.archive.org/web/20161224034909/http://flash.flowplayer.org/plugins/streaming/bwcheck.html.

(56) References Cited

OTHER PUBLICATIONS

International Preliminary Report on Patentability for PCT/US2018/020229 dated Sep. 10, 2019, 12 pages.
International Organization for Standardization, "Information Technology—Dynamic Adaptive Streaming Over HTTP (DASH), Part 1: Media Presentation Description and Segment Formats/ Amendments 2: Spatial Relationship Description, Generalized URL Parameters and Other Extensions". International Standard, ISO/IEC 23009-1:2015/FDAM 2:2015(E), Second Edition (Annex H), Feb. 25, 2015, 23 pages.
IBC, "D-ZERO—Low Latency ABR Streaming". Sky Italia, available at: http://www.ibc.org/ibc-awards/ibc2016-innovation-award-entrants/ibc-innovation-award-for-content-delivery-2016-entrants, Sep. 2016.
IBC, "True live OTT Solution Puts F1 in Pole Position". Tata Communications, available at: http://www.ibc.org/ibc-awards/ibc2016-innovation-award-entrants/ibc-innovation-award-for-content-delivery-2016-entrants, Sep. 2016.
Sye, "Sye". Web Archive dated Sep. 5, 2016, available at: https://netinsight.net/start/technical-offer-sye/, 1 page.
Sun, Lei, et. al., "The Dynamic Videobook: A Hierarchical Summarization for Surveillance Video". IEEE International Conference on Image Processing, (2013), pp. 3963-3966.
TataComms. "Transforming media + entertainment (subtitles)". Youtube link dated Sep. 10, 2015, available at: https://w,w.youtube.com/watch?v=KUxxPYocMiw, 19 pages.
Tata Communications, "Media and Entertainment Services". Tata Communications, Archived on Feb. 27, 2017. Retrieved from https://web.archive.org/web/20170217212843/https://www.tatacommunications.com/products-services/enterprises/media-entertainment-services, 1 page.
Notification of Transmittal of the International Search Report and the Written Opinion of the International Searching Authority, or the Declaration for PCT/US2017/031335 dated Jul. 19, 2017, 16 pages.
Giladi, A. et. al., "Use Cases for Conveying Source Information". International Organization for Standardization Coding of Moving Pictures and Audio, ISO/IEC JTC1/SC29/WG11, m31594, Oct. 2013, 3 pages.
Liu S., et al, "SVC Inter-Layer Prediction for SVC Bit-Depth Scalability". Joint Video Team of ISO/IEC JTC1/SC29/WG11 and ITU-T SG.1624, No. JVT-X075, Jun. 2007, 12 pages.
International Search Report and Written Opinion of the International Searching Authority for PCT/US2017/041142 dated Oct. 11, 2017.
Written Opinion of the International Preliminary Examining Authority for PCT/US2017/031335 dated Apr. 5, 2018.
Written Opinion of the International Preliminary Examining Authority for PCT/US2017/041142 dated Jun. 20, 2018.
International Preliminary Report on Patentability for PCT/US2017/031335 completed on Jun. 26, 2018.
International Preliminary Report on Patentability for PCT/US2017/041142 completed on Sep. 19, 2018.
Mantiuk, R., et. al., "Display Adaptive Tone Mapping". ACM Transactions on Graphics (TOG), vol. 27, No. 3, Aug. 2008, available at: http://resources.mpi-inf.mpg.de/hdr/datmo/mantiuk08datm.pdf, 10 pages.
Mavlankar, A. et. al., "Video Streaming with Interactive Pan/Tilt/Zoom", Oct. 2009. Available at: http://web.stanford.edu/~bgirod/pdfs/Mavlankar_Girod_Chapter_Oct09.pdf.
Unifore Security, "What's ROI (Region of Interest) Video Surveillance Technology?". Unifore.net, Oct. 23, 2015, 4 pages.
Mavlankar, A., et. al., "Peer-to-Peer Multicast Live Video Streaming with Interactive Virtual Pan/Tilt/Zoom Functionality". In 2008 15th IEEE International Conference on Image Processing, Oct. 2008, pp. 2296-2299.
Chen, Y., et. al., "Intra-and-Inter-Constraint-Based Video Enhancement Based on Piecewise Tone Mapping". IEEE Transactions on Circuits and Systems for Video Technology, vol. 23, No. 1, Jan. 2013, pp. 74-82.
Vehkaperä, J., et. al., "Replacing Picture Regions in H. 264/AVC Bitstream by Utilizing Independent Slices". Proceedings of 2010 IEEE 17th International Conference on Image Processing, Sep. 26-29, 2010, pp. 3397-3400.
ClassXTeam, "ClassX Mobile". You Tube Link, published on May 8, 2011, available at: https://www.youtube.com/watch?v=KuloCw4hj8.
International Telecommunication Union, "Advanced Video Coding for Generic Audiovisual Services". Series H: Audiovisual and Multimedia Systems, ITU-T, H.264, Feb. 2014, 790 pages.
International Organization for Standardization, "Information Technology—Dynamic Adaptive Streaming Over HTTP (DASH), Part 1: Media Presentation Description and Segment Formats". International Standard, ISO/IEC 23009-1, Second Edition, May 15, 2014, 152 pages.
Lavigne, F., "Automatic Video Zooming for Sport Team Video Broadcasting on Smart Phones". Available at: http://tcts.fpms.ac.be/publications/papers/2010/visapp2010_flfcxd.pdf, (2010), 7 pages.
Mavlankar, A., et al., "An Interactive Region-of-Interest Video Streaming System for Online Lecture Viewing". Proceedings of 2010 IEEE 18th International Packet Video Workshop, Dec. 13-14, 2010, pp. 64-71.
International Search Report and the Written Opinion of the International Searching Authority for PCT/US2016/046317, dated Oct. 19, 2016, 11 pages.
International Preliminary Report on Patentability for PCT/US2016/046317 dated Mar. 1, 2018.
Mavlankar, A., et. al., "Optimal Slice Size for Streaming Regions of High Resolution Video with Virtual Pan/Tilt/Zoom Functionality", Jun. 2007. Available at: http://web.stanford.edu/~bgirod/pdfs/MavlankarEUSIPCO07-pdf.
Written Opinion of the International Preliminary Examining Authority for PCT/US2016/053512 dated Aug. 28, 2017.
International Preliminary Report on Patentability, Corrected Version, for PCT/US2016/053512 completed Jan. 15, 2018.
International Preliminary Report on Patentability for PCT/US2016/053512 completed Jan. 15, 2018.
International Search Report and Written Opinion of the International Searching Authority for PCT/US2016/053512, dated Nov. 28, 2016, 10 pages.
Yilmaz, A., et. al., "Object Tracking—A Survey". ACM Computing Surveys, vol. 38, No. 4, Article 13, Dec. 2006, pp. 1-45.
International Organization for Standardization, "Information Technology—Dynamic adaptive Streaming Over HTTP (DASH)—Part 3: Implementation Guidelines/AMD 1: Alignment with ISO/IEC 23009-1:2014 and Extensibility". International Standard, ISO/IEC JTC 1/SC 29N, ISO/IEC TR 23009-3:2014/PDAM1, ISO/IEC JTC 1/SC29/WG11, No. N15990, Mar. 2, 2016, 49 pages.
International Search Report and Written Opinion of the International Searching Authority for PCT/US2017/040060 dated Sep. 11, 2017, 15 pages.
Wang, X., et. al., "Multi-Stream Streaming in DASH (Multi-Stream DASH)". Huawei Technology, LTD., Motion Picture Expert Group (MPEG) Meeting, No. m35885, Feb. 2015, 8 pages.
International Preliminary Report on Patentability for PCT/US2017/040060 dated Jan. 1, 2019.
International Search Report and Written Opinion of the International Searching Authority for PCT/US2017/026388 dated Jul. 24, 2017, 14 Pages.
Written Opinion of the International Preliminary Examining Authority for PCT/US2017/026388 dated Mar. 5, 2018.
International Preliminary Report on Patentability for PCT/US2017/026388 completed on Jul. 12, 2018.
International Search Report and Written Opinion of the International Searching Authority for PCT/US2018/018540 dated Apr. 6, 2018.
Mavlankar, A. et. al., "An Interactive Region-of-Interest Video Streaming System for Online Lecture Viewing". Proceedings of 2010 IEEE 18th International Packet Video Workshop Dec. 13-14, 2010, pp. 64-68.
Written Opinion of the International Preliminary Examining Authority for PCT/US2018/018540 dated Jan. 18, 2019, 7 pages.

(56) References Cited

OTHER PUBLICATIONS

International Preliminary Report on Patentability for PCT/US2018/018540 completed Apr. 26, 2019, 7 pages.
Ubuntu, "Display Adaptive Tone Mapping". Ubuntu Manuals, available at: <http://manpages.ubuntu.com/manpages/xenial/en/man1/pfstmo_mantiuk08.1.html, (2010), 7pages.
Invitation to pay additional Fees for PCT/US2018/020229, issued by the International Searching Authority, and dated Jun. 8, 2018, 14 pages.
International Search Report and Written Opinion of the International Searching Authority for PCT/US2018/020229 dated Jul. 31, 2018, 18 pages.
Brandenburg, R., et., al., "Immersive Second-Screen Experiences Using Hybrid Media Synchronization". Media Synchronization Workshop, (2013), 7 pages.
HBB Next, "Immersive Second Screen Synchronization". HBB Next, Next Generation Hybrid Media, Applications, available at: http://www.mediafutureweek.nl/wp-content/uploads/2014/05/poster_IBC_2013_applications.pdf, (2013), 1 page.
Niamut, O.A., et. al., "Live Event Experiences—Interactive UHDTV on Mobile Devices". IBC2014 Conference, Sep. 11-15, 2014, 8 pages.
Lindgren, P., et., al., "How True, Synchronized Live OTT Can Change the Second Screen and Social TV Game". IBC2016 Conference, Sep. 8-12, 2016, pp. 1-8.
Shibata, F., et. al., "A View Management Method for Mobile Mixed Reality Systems". In Virtual Environments 2008: 14th Eurographics Symposium on Virtual Env., May 29-30, 2008, 8 pages.
International Search Report and Written Opinion of the International Searching Authority for PCT/US2017/043248 dated Oct. 5, 2017.
Written Opinion of the International Preliminary Examining Authority for PCT/US2017/043248 dated Jun. 28, 2018.
International Preliminary Report on Patentability for PCT/US2017/043248 completed Sep. 27, 2018.
Taylor, T. "NFL using Zebra RFID Chips to Track Player Movements, Gather Data". Sports Illustrated article, available at: http://web.archive.org/web20160703053654/http://www.si.com:80/, updated Mar. 6, 2015, 4 pages.
Zebra, "Zebra and the NFL: Change the Game". Zebra.com article, available at: http://web.archive.org/web/20160604013821/https://www.zebra.com/us/en/nfl.html, web archive dated Jun. 4, 2016, 4 pages.
Sheikh Y., et. al., "Geodetic Alignment of Aerial Video Frames". In Shah M., Kumar R. (eds) Video Registration, Chapter 7, (2003), pp. 141-177.
"NASCAR Pointer Screen Capture", retrieved from video available at: http://www.sportvision.com/media/pointers, on Jul. 8, 2016, 1 page.
Aberdeen, "Case Study: FCC Challenges Video Editors to Make Room for Caption Placement", Aug. 4, 2015, 3 pages.
Richardson, Iain E., et. al., "The H.264 Advanced Video Compression Standard, Chapter 10: Extensions and Directions". John Wiley, Second Edition, (2010), pp. 287-311.
Intel Corporation, "Overview of new radio access technology requirements and designs", 3GPP Tdoc R1-162379, 3GPP TSG RAN WG1 Meeting #84bis, Busan, Korea, Apr. 11-15, 2016, 4 pages.
ETSI TS 102690 V1.1.1, Machine-to-Machine Communications (M2M), "Functional Architecture" Oct. 2011, 280 pages.
European Telecommunications Standards Institute (ETSI/TS 102 690 V1.2.1; Machine-to-Machine Communications (M2M); Functional Architecture, Jun. 2013, 279 pages.
Qualcomm incorporated S2-162339 "Solution for key issue 1 on network slicing: network slice and network functions selection based on evolved eDeCOR model" S2-162339, SA WG2 Meeting #115, May 23-27, 2016, Nanjing, P.R. China (7 pages).
ZTE: "Considerations on channel access procedure for NR-U", 3GPP Draft; R2-1811281 Considerations On Random Access Procedure for NR-U, 3rd Generation Partnership Project (3GPP), Mobile Competence Centre; 650, Route Des Lucioles; F-06921 Sophia-Antipolis Cedex; France, vol. RAN WG2, No. Gothenburg, Sweden; Aug. 20, 2018-Aug. 24, 2018 Aug. 9, 2018, (Aug. 9, 2018), XP051520945.
Huawei et al: "Numerology and wideband operation in NR unlicensed", 3GPP Draft; R1-1803677, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018 Apr. 15, 2018 (Apr. 15, 2018), XP051425974.
Nokia et al: "Feature Lead's Summary on Channel Access Procedures" 3GPP Draft; R1-1809801 NRCJ Channel Access Summary, 3rd Generation Partnership Project (3GPP), Mobile Competence Centre; 650, Route Des Lucioles; F-06921 Sophia-Antipolis Cedex; France, vol. RAN WGI, No. Gothenburg, Sweden; Aug. 20, 2018-Aug. 20, 2018 Aug. 23, 2018 (Aug. 23, 2018),XP051517160.
Huawei et al: "Initial access in NR unlicensed", 3GPP Draft; R1-1808062, 3rd Generation Partnership Roject (3GPP),Mobile Competence Centre; 650, Route Des Lucioles F-06921 Sophia-Antipolis Cedex; France, vol. RAN W1I, No. Gothenburg, Sweden; Aug. 20, 2018-Aug. 24, 2018 Aug. 10, 2018 (Aug. 10, 2018), XP051515466.
European Telecommunications Standards Institute (ETSI), TS 102 690 V2.1.1, Technical Specification, Machine-to-Machine Communications (M2M); Functional Architecture, Oct. 2013, 332 pages.
OneM2M Technical Specification, oneM2M-TS-0001 oneM2M Functional Architecture-V-0.0.7, oneM2M Functional Architecture, Aug. 26, 2013, 43 pages.
Third Generation Partnership Project, "Technical Specification Group Radio Access Network; Feasibility study for Further Advancements for E-UTRA (LTE-Advanced) (Release 13)," 3GPP TR 36.912 V13.0.0, Dec. 2015 (62 pages).
Third Generation Partnership Project, "Technical Specification Group Radio Access Network; Study on Elevation Beamforming/Full-Dimension (FD) Multiple Input Multiple Output (MIMO) for LTE" (Release 13), 3GPP TR 36.897 V13.0.0, Jun. 2015 (58 pages).
Third Generation Partnership Project, Technical Specification Group Radio Access Network; Evolved Universal Terrestrial Radio Access (E-UTRA); Study on Latency Reduction Techniques for LTE (Release 14) 3GPP FR 36.881 V14.0.0, Jun. 2016 (99 pages).
Third Generation Partnership Project, "Technical Specification Group Services and System Aspects; IP Multimedia Substystem (IMS)" Stage 2 (Release 12), 3GPP TS 23.228 V12.1.0, Jun. 2013, (296 pages).
Third Generation Partnership Project, "Technical Specification Group Services and System Aspects; Feasibility Study on New Services and Markets Technology Enablers for Critical Communications" Stage 1 (Release 14), 3GPP TR 22.862 V14.1.0, Sep. 2016, (31 pages).
Third Generation Partnership Project, "Technical Specification Group Services and System Aspects Feasibility Study on New Services and Markets Technology Enablers - Network Operation" Stage 1 (Release 14), 3GPP TR 22.864 V14.1.0, Sep. 2016 (35 pages).
Third Generation Partnership Project, "Technical Specification Group Services and System Aspects; Feasibility Study on New Services and Markets Technology Enablers—Enhanced Mobile Broadband" Stage 1 (Release 14), 3GPP TR 22.863 V14.1.0, Sep. 2016 (21 pages).
IEEE P802.11, Wireless LANs, Proposed TGax draft specification, Comment Resolutions on UL MU Operation, Sep. 13, 2016, (30 pages).
Third Generation Partnership Project, "Technical Specification Group GSM/EDGE Radio Access Network; Cellular system support for ultra-low complexity and low throughput Internet of Things (CIoT)" (Release 13), 3GPP TR 45.820 V13.1.0, Nov. 2015 (495 pages).
Third Generation Partnership Project, "Technical Specification Group Services and System Aspects; Feasibility Study on New Services and Markets Technology Enablers" Stage 1 (Release 14), 3GPP TR 22.891 V1.1.0, Nov. 2015 (95 pages).
Third Generation Partnership Project, "Technical Specification Group Services and System Aspects; Study on architecture enhancements for Cellular Internet of Things" (Release 13), 3GPP TR 23.720 V13.0.0, Mar. 2016 (94 pages).

(56) References Cited

OTHER PUBLICATIONS

ITU-R, "IMT Vision—Framework and Overall Objectives of the Future Development of IMT for 2020 and Beyond", Recommendation ITU-R M.2083-0, M Series, Mobile, Radiodetermination, Amateur and Related Satellite Services, Sep. 2015 (21 pages).
Third Generation Partnership Project, "Technical Specification Group Radio Access Network; Evolved Universal Terrestrial Radio Access (E-UTRA); Medium Access Control (MAC) protocol specification" (Release 13), 3GPP TS 36.321 V13.0.0, Dec. 2015 (82 pages).
Third Generation Partnership Project, "Technical Specification Group Radio Access Network; Study on Scenarios and Requirements for Next Generation Access Technologies" (Release 14), 3GPP TR 38.913 V0.3.0, Jun. 2017 (30 pages).
Third Generation Partnership Project, "Technical Specification Group Radio Access Network; Evolved Universal Terrestrial Radio Access (E-UTRA); Radio Resource Control (RRC); Protocol specification" (Release 13), 3GPP TS 36.331 V13.0.0, Dec. 2015 (507 pages).
Third Generation Partnership Project, "Technical Specification Group Radio Access Network; Evolved Universal Terrestrial Radio Access (E-UTRA); Physical layer procedures (Release 12)," 3GPP TS 36.213 V13.0.0, Dec. 2015 (6 pages).
Third Generation Partnership Project, "Way Forward on Frame Structure", 3GPP TSG RAN WG1 #85, R1-165669, Qualcomm and etc., Nanjing, China, May 23-27, 2016, Agenda Item 7.1.4 (2 pages).
Third Generation Partnership Project, "Technical Specification Group Radio Access Network, Study on Scenarios and Requirements for Next Generation Access Technologies, (Release 14)", (3GPP), TR 38.913 V0.2.0, Feb. 2016 (19 pages).
Third Generation Partnership Project, "Technical Specification Group Radio Access Network; Evolved Universal Terrestrial Radio Access (E-UTRA); Physical Channels and Modulation (Release 13)", 3GPP TS 36.211 713.1.0, Mar. 2016 (155 pages).
Third Generation Partnership Project, 3GPP TSG RAN WG1 #85, R1-164013, "Framework for Beamformed Access" May 2016 (4 pages).
Hattachi, R,E,, et al., "White Paper" NGMN 5G Initiative, v1.0, Feb. 17, 2015 (125 pages).
Third Generation Partnership Project, "Frame Structure for NR", 3GPP TSG-RAN WG1 #85, R1-164628, Ericsson, Nanjing, China, May 23-27, 2016 (3 pages).
Third Generation Partnership Project, "Introduction of Virtual Cell" 3GPP TSG RAN WG2 Meeting #93bis, R2-162571, Apr. 2016 (3 pages).
Third Generation Partnership Project, "Further enhancements on signaling reduction to enable light connection for LTE", 3GPP RP-160425 TSG RAN Meeting #71, Intel Corporation, Gothenburg, Sweden, Mar. 7-10, 2016 (7 pages).

Huawei, "Network slice selection" RAN WG3 Meeting #92, R3-16113, Agenda Item 10.2.3, Nanjing, China, May 23-27, 2016 (4 pages).
Third Generation Partnership Project, "Update the network slicing use case in Smarter", 3GPP S1-152395 Revision of S1-152074, ZTE Corporation et al., ZTE Smarter Update the Network Slicing Use case REV3, vol. SA WG1, No. Belgrade Serbia, Aug. 24, 2015 (3 pages).
Chu, D., "Polyphase Codes With Good Periodic Correlation Properties", IEEE Transactions On Information Theory, Jul. 1972, pp. 531-532 (2 pages).
Third Generation Partnership Project, "Technical Specification Group Services and Systems Aspects, Feasibility Study on New Services and Markets Technology Enablers for Massive Internet of Things, Stage 1" (Release 14), 3GPP TR 22.861 V14.1.0, Sep. 2016, (28 pages).
European Telecommunications Standards Institute (ETSI TS) 124 302 V13.5.0, Universal Mobile Telecommunications System (UMTS); LTE; Access to the 3GPP Evolved Packet Core (EPC) via non-3GPP access networks; Stage 3 (Release 13), 3GPP TS 24.302 V13.5.0, Apr. 2016 (128 pages).
European Telecommunications Standards Institute (ETSI TS) 136 304 V13.0.0, "LTE; Evolved Universal Terrestrial Radio Access (E-UTRA); User Equipment (UE) procedures in idle mode" (Release 13), 3GPP TS 36.304 V13.0.0, Feb. 2016 (44 pages).
Third Generation Partnership Project, (3GPP) TSG RAN WG1 #85, R1-164014, Discussion on RS for Beamformed Access, Samsung, Nanjing, China, May 23-27, 2016 (3 pages).
Third Generation Partnership Project, (3GPP) S2-161324 SA WG2 Meeting #113, Solution to Key Issue an Mobility Framework, Sophia Antipolis, FR, Feb. 23-26, 2016 (3 pages).
European Telecommunications Standards Institute (ETSI TS) Digital cellular telecommunications system (Phase 2+) (GSM); Universal Mobile Telecommunications System (UMTS); General Packet Radio Service (GPRS); Service Description; Stage 2 (3GPP TS 23.060 version 13.6.0 (Release 13) Apr. 2016 (364 pages).
European Telecommunications Standards Institute (ETSI TS) LTE; General Packet Radio Service (GPRS) enhancements for Evolved Universal Terrestrial Radio Access Network (E-UTRAN) access (Release 13), 3GPP TS 23.401 V13.6.1, May 2016 (367 pages).
European Telecommunications Standards Institute (ETSI TS) Technical Specification LTE; Evolved Universal Terrestrial Radio Access (E-UTRA); Requirements for support of radio resource management (Release 14), 3GPP TS 36.133 V14.7.0, Apr. 2018 (2999 pages).
OMA Open Mobile Alliance, "Lightwieght Machine to Machine Technical Specification, Approved Version 1.0", OMA-TS-LightweightM2M-V1_0-20170208-A, Feb. 8, 2017 (138 pages).

* cited by examiner

Continued from FIG. 9A

910 — PARTITION DEFAULT STREAM INTO SLICES

Default slices

912 — PARTITION REMAPPED STREAMS INTO SLICES

Slices with ROI 1 Remapped

914 — STORE DATA ASSOCIATING REMAPPING WITH SLICES

Slice with ROI 2 Remapped

916 — SELECT SLICES BASED ON CLIENT REQUEST

Client Selects ROI 1 Only

Client Selects both ROI 1 and 2

Continued in FIG. 9C

SYSTEMS AND METHODS FOR REGION-OF-INTEREST TONE REMAPPING

CROSS-REFERENCE TO RELATED APPLICATIONS

The present application is a national stage application under 35 U.S.C. 371 of International Application No. PCT/US2017/041142, entitled SYSTEMS AND METHODS FOR REGION-OF-INTEREST TONE REMAPPING, filed on Jul. 7, 2017, which claims benefit under 35 U.S.C. § 119(e) from U.S. Provisional Patent Application Ser. No. 62/360,105, entitled "SYSTEMS AND METHODS FOR REGION-OF-INTEREST TONE REMAPPING," filed Jul. 8, 2016, the entirety of which is incorporated herein by reference, and from U.S. Provisional Patent Application Ser. No. 62/365,863, entitled "CLIENT-SIDE TONE REMAPPING USING SERVER TRACKING AND REMAPPING CUES," filed Jul. 22, 2016, the entirety of which is incorporated herein by reference.

BACKGROUND

In many video distribution systems, a source image is captured at a high bit depth, such as 10-16 bits per sample (bps) for each of three primary colors and is converted to a lower bit depth, such as 8 bits per sample for each of the three primary colors in the source before the source is delivered to a display. At 16 bps, a color sample can have over 65,000 different values, but at 8 bps, the color sample can only have 256 different values. This conversion, or remapping, reduces bitrate but may result in a reduction in video quality. This methodology can cause banding and loss of detail. It would be desirable to improve video quality without unnecessarily increasing the bitrate requirements.

In some scenarios, a camera captures between 8 to 16 bits per pixel (bpp) for each of the three primary colors. The higher the bit depth, the greater the detail or quality of picture that may be produced.

Consumer devices, including HDTVs, mobile devices, or computers, are generally equipped to receive video with bit depth of 8 bpp for each primary color. Current consumer display technology such as LCD, LED, and Plasma, typically display around 8 bpp for each primary color as a balance of visual quality and cost effectiveness.

One TV distribution scenario uses a camera which captures video at a high bit depth (such as 10-16 bpp). This signal is converted to a lower bit depth, such as 8 bpp, for broadcast delivery to a consumer display. At 16 bpp, a pixel (or each component of a pixel such as an R, G, or B component, a Y, U, or V component or a Y, Cr, or Cb component) may be assigned one of 65,536 ($2^{16}$) different values, but at 8 bpp, a pixel (or each component of a pixel) may be assigned one of only 256 ($2^8$) different values.

In addition to creating additional streams by using increased native resolutions, viewing quality may be enhanced by creating streams with a higher bit depth. Conversion from a high bit depth to a low bit depth may result in a variety of video quality problems, such as loss of detail, reduced dynamic range, image artifacts, and problems at the extremes of the brightness scale. Loss of detail causes flattening or complete loss of fine textures. Reduced bit depth may result in black colors being less black, and white colors being less white, for example. Image artifacts include banding instead of smooth gradients and stair-step edge artifacts. Brightness problems may include issues with objects in dark or bright sections of the image appearing severely degraded or even washed out.

Tone mapping is a technique used to map the sample values at a particular pixel from one value to another. Tone mapping can be employed for different effects such as giving an image or video an overall lighter or darker appearance or to approximate the appearance of high-dynamic-range (HDR) images on standard display devices.

SUMMARY

Tone and/or Bit Depth Remapping.

Systems and methods described herein enable viewers of video streams to select one or more particular regions of interest to undergo a selected tone mapping. The regions of interest may be stationary or may move across the screen. In an exemplary method of providing user selectable tone mapping for regions of interest, a first video stream generated using a first tone mapping is sent to a video client, e.g. by a server. Information identifying at least one available region of interest associated with the first video stream is also sent to the client. A user of the client device may select one or more of these regions of interest, and the client device reports the selection to the server. The server receives an indication of the region or regions selected by the client and sends a second video stream to the client. If the user selected one of the available regions of interest, then in the second video stream, an area of the video outside the selected region of interest is generated using the first tone mapping, and an area of the video within the selected region of interest is generated using a second tone mapping different from the first tone mapping. If the user selected more than one of the available regions of interest, then in the second video stream provided by the server to the client, the area of the video which is outside the selected regions of interest is generated using the first tone mapping, and the areas of the video within the selected regions of interest is generated using tone mappings other than the first tone mapping. For example, the areas corresponding to each of the selected regions of interest in the second video stream may be generated using tone mappings designed for or optimized for the individual regions of interest.

In some embodiments, the tone mapping used in a selected region of interest is selected to generate a highlighting effect to allow the user to more readily follow the region of interest. The selection of the particular tone mapping may be made by the user. For example, the user may select whether the tone mapping results in a highlighting effect. In some embodiments, the user may also select the degree of highlighting. Some embodiments include tracking of a location of at least one object in a video sequence. This may be of particular use where the region of interest is a region occupied by a particular athlete or ball in a sporting event, by a particular horse or car in a race, or in other circumstances where it may otherwise be difficult to follow a particular region of interest. In some embodiments, the location of the selected region of interest changes on a frame-by-frame basis. In some embodiments, the location of the selected region of interest changes on a segment-by-segment basis.

In various embodiments, region of interest may have a rectangular shape, an oval shape, or other regular or irregular shape.

In some embodiments, the second video stream is generated on demand by combining independently-coded slices of the video.

In another exemplary embodiment, a method is provided to enable user-selectable tone mapping for regions of interest in an adaptive bit rate (ABR) video system. The location of one or more objects or other regions of interest is tracked in a video sequence. Information describing the objects may be generated and stored. One or more different tone maps are applied to the different regions of interest. In some embodiments, a user is provided with the ability to select both which region(s) of interest are to be highlighted and which tone map(s) are to be used to effect the highlighting. In response to user selection of a particular region of interest and a particular tone map, a user is sent a video stream that includes the selected region(s) of interest highlighted with the selected tone map(s). The application of various tone maps to various regions of interest may be performed in advance of the request by the user, with a server delivering the appropriate pre-mapped video stream in response to the client request. In some embodiments, the video with applied tone maps is divided into a plurality of slices. Those slices having the appropriate tone mappings may be merged on demand in response to a user request, such that the user's client device receives only a single video stream instead of a plurality of slices. In other embodiments, the appropriate slices may be delivered separately to the client device to be displayed together.

Client-Side Mapping Selection.

Systems and method described herein enable viewers of video streams to select one or more particular regions of interest to undergo a corresponding tone remapping. The regions of interest may be stationary or may move across the screen. In exemplary embodiments, one or more networked servers operate to perform the (potentially computationally expensive) calculations involved in tracking regions of interest (including objects of interest) in a video stream and identifying parameters for one or more tone remapping functions. This information may then be delivered to a video client device. In some embodiments, the selection of parameters for one or more tone remapping functions is based on information from the client device that identifies a display type, reports on ambient illumination at the client location, and/or provides other information regarding viewing conditions. The tone mapping parameters may be selected or calculated with the goal of optimizing visibility of a selected region of interest under the viewing conditions reported by the client device. The region of interest information (which may include the location and dimensions of the region of interest in each video frame) and parametric values of a selected remapping function are passed in-band to the client in some embodiments. The client device may then operate to apply the tone remapping function to one or more selected regions of interest using the parameters received from the server.

In an exemplary embodiment, a high bit depth video (which may be a high dynamic range video) is captured. A server operates to determine the location of regions of interest (which may be regions that include objects of interest) in each frame of the video. The server further generates a parameter set for each of the regions of interest, where the parameter set defines a tone map to be applied if a user selects the corresponding region of interest for highlighting. The parameter set and/or the tone map may be defined for all time, for a certain period of time, or may vary with time (e.g. on a frame-by-frame basis).

The parameter sets may include parameters such as a tone map model identifier, maximum and minimum values (e.g. in the case of a linear map with clipping), a width and midpoint (e.g. in the case of a sigmoid mapping), a gamma value (in the case of gamma mapping) and/or other parameters, such as parameters to define a piecewise linear tone map or parameters in a lookup table. In some embodiments, the server determines the locations of regions of interest by collecting object-tracking sensor data and computing the location of an object in a frame by fusing camera location and the sensor data. In some embodiments, the server receives, from the client device, a report identifying viewing conditions at the client. The viewing conditions may include, for example, information on the ambient illumination level at the client device and/or information on the type of display device being used. In such embodiments, the server may generate a tone map parameter set based on the reported viewing conditions. In some embodiments, the server may generate a plurality of parameter sets, each corresponding to a different viewing condition, and the client may select the parameter set to use based on the viewing conditions.

In another exemplary embodiment, a video client device receives a video stream and receives a description of objects being tracked in the video. For each object being tracked in each frame, the video client device receives tone map cues, such as a tone map parameter set, from a server. The client may receive different tone maps for different viewing conditions such as, for example, ambient illumination and display type. The client device applies the tone map defined by the tone map cues to an area of the video frame that corresponds to a selected object. The selection of tone map may be made based on viewing conditions. In some embodiments, the client device provides feedback to the server, where the feedback may identify the viewing conditions.

DETAILED DESCRIPTION

Distribution of Streaming Video Content.

Figure 1:
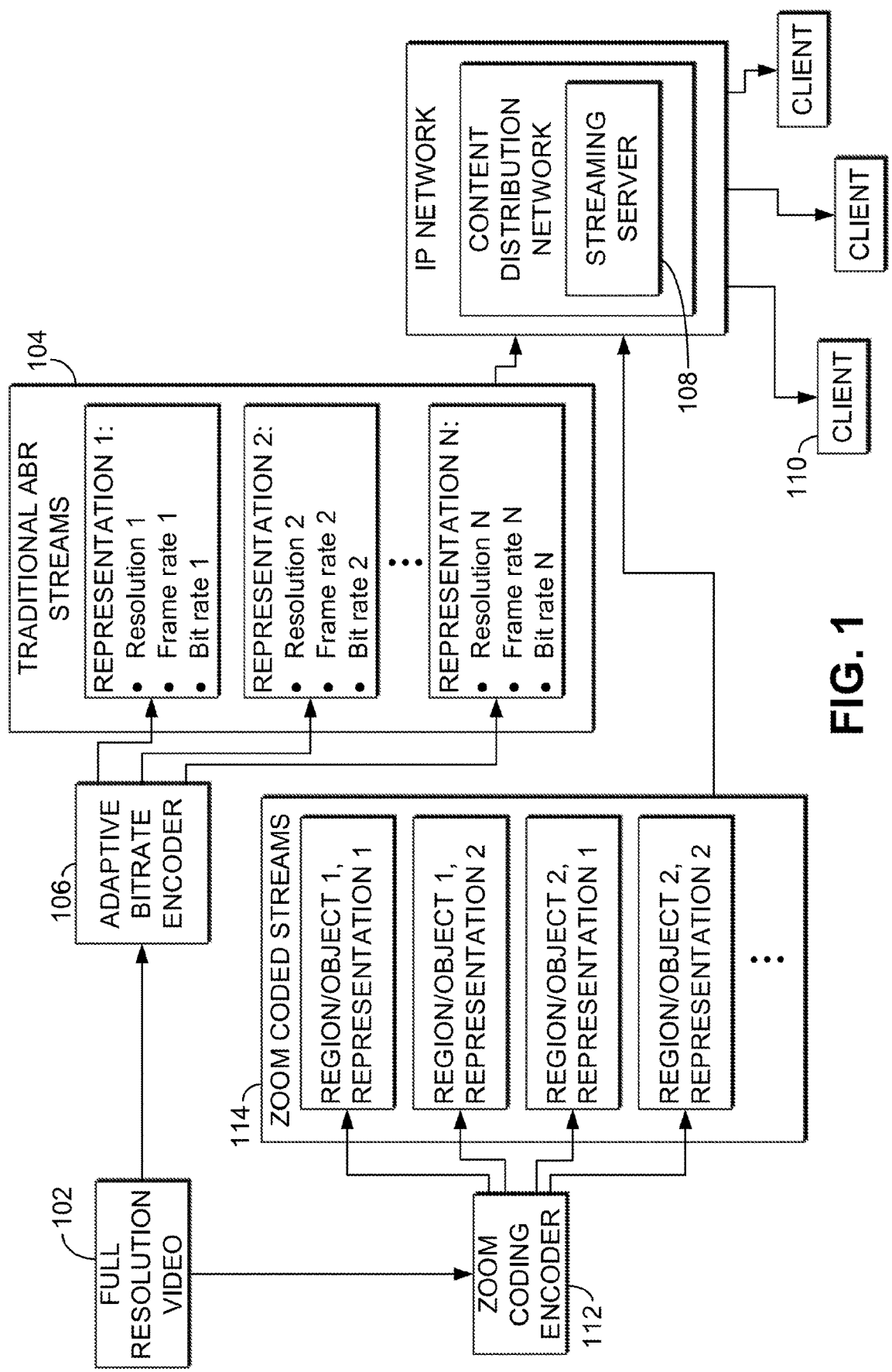
FIG. 1 is a schematic block diagram of an adaptive bit rate (ABR) video distribution system with zoom coding capabilities.

An exemplary functional architecture of an adaptive bitrate video distribution system with zoom coding features is illustrated in FIG. 1. Traditionally, an input full-resolution stream 102 (4K resolution, for example) at a high bit depth may be processed and delivered at a lower resolution, such as high definition (HD), and lower bit depth, to an end consumer. In FIG. 1, traditional processing is represented in the components labeled "Traditional ABR Streams" 104. Using traditional adaptive bit rate (ABR) coding, an adaptive bit rate encoder may produce ABR streams 106 that are published to a streaming server 108, and the streaming server in turn delivers customized streams to end customers 110. The traditional ABR streams may be produced at various alternative resolutions, bit rates, frame rates, or using other variations in encoding parameters.

An exemplary zoom coding encoder 112, shown in the bottom part of the workflow in FIG. 1, receives the high-bit-depth input video stream 102 and with a variety of techniques produces auxiliary video streams 114. These auxiliary video streams may include, for example, streams representing cropped and/or zoomed portions of the original video, or, as discussed in greater detail below, streams to which different tone maps have been applied to different regions. These auxiliary video streams may in turn be encoded using traditional ABR techniques. A user is presented with the choice of watching the normal program (delivered using ABR profiles) and in addition, zoom coded streams that may represent zoomed portions of the original program or other auxiliary streams relating to the original program. Once the user makes a choice to view a zoom coded stream, the client may request an appropriate stream from the streaming server. The streaming server may then deliver the appropriate stream to the end client.

The streaming server 108 is configured to transmit a video stream over a network to different display devices. The network may be a local network, the Internet, or other similar network. The display devices include devices capable of displaying the video, such as a television, computer monitor, laptop, tablet, smartphone, projector, and the like. The video stream may pass through an intermediary device, such as a cable box, a smart video disc player, a dongle, or the like. The client devices 110 may each remap the received video stream to best match the display and viewing conditions.

Bit Depth Conversion.

In converting from high bit depth to low bit depth, the conversion may be linear or non-linear. Non-linear conversions may be used to provide contrast enhancements and other effects. Some embodiments may be described as an "S" shaped or sigmoid conversion curve in which the horizontal axis is the high bit depth input pixel value and vertical axis is the low bit depth output pixel value. Non-linear curves may provide more detail in certain pixel value ranges and less detail in other pixel value ranges. For example, mid-tones may receive a relatively greater proportion of the available dynamic range than dark or light tones. Conversion may be applied to any or all of the available image components (e.g. luminance, chrominance, red, green, blue, or other components).

Figure 2:
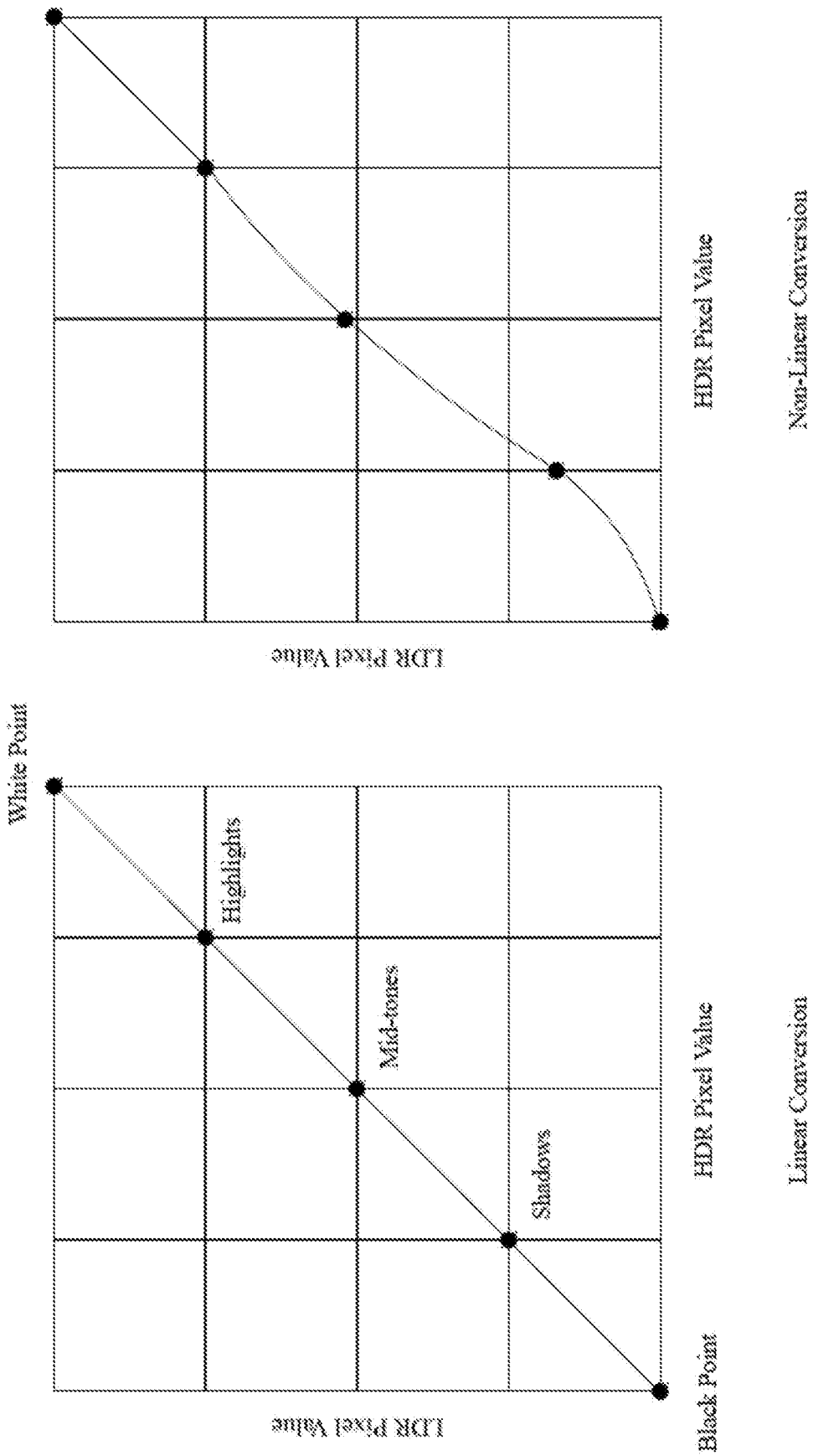
FIG. 2 includes graphs of two different high-bit-depth to low-bit-depth conversion functions.

FIG. 2 depicts two graphs, one showing a linear high-bit-depth to low-bit-depth conversion function and one showing a nonlinear high-bit-depth to low-bit-depth conversion function. S curves may over-flatten mid-tones, so a very gentle S curve or partial S curve may be used. Both curves call attention to five pixel-value points and the conversion of those values for each curve. Black and white values anchor each end of the curve with shadows, mid-tones, and highlights occurring at successive points.

Converting from high bit depth (e.g. 16 bpp) to low bit depth (e.g. 8 bpp) prior to delivery to a display may cause banding, loss of detail, and other image effects.

Optimal high-bit-depth to low-bit-depth conversion mappings may depend on a video signal's pixel characteristics. Such high-bit-depth to low-bit-depth conversion maps may vary per-pixel, per region, or per frame. Applying a single conversion map to an entire frame may result in some portions of the frame receiving non-optimal mappings. Re-computation of the optimal mapping may be performed when temporal variations with a region change significantly (even when tracked). For example, a given image (or frame of a video sequence) may have one portion in the shadows and another portion in bright light. Such a scenario may benefit from application of different conversion maps in different regions.

By changing the conversion to increase sensitivity for dark areas, textures remain visible after the conversion. This change comes as a tradeoff to the bright areas, which become washed out. Therefore, it can be beneficial to separate the total image into regions of interest with different conversions available for each area. Alternatively, different mapping sets may be created for different viewing device types and different ambient viewing conditions.

Different consumer display devices include controls to vary display parameters, such as contrast and brightness. The contrast, brightness, and other image control parameters available on a user's display operate on the low-bit-depth signal received by the display, not the native high-bit-depth source signal.

Regions of interest may be defined in the original content, and different conversion functions may be designed (e.g., optimized) to distribute pixel values within the region of interest. This process may be repeated for each region of interest in the source material. In some embodiments, regions of interest are highlighted A suitable (e.g., optimal) conversion function may be defined for the pixel values in a region of interest. For example, a histogram may be generated from the pixel values which fall within a given ROI, and a suitable (or optimal) conversion function may be generated from the histogram. Exemplary techniques that may be used for generation of a conversion function from histogram data are described in, for example, R. Mantuik et al., *Display Adaptive Tone Mapping*, 27 (3) ACM TRANSACTIONS ON GRAPHICS (2008).

Alternately, a suitable conversion function may be created for user-defined (e.g., artist- or content producer-defined) ROIs. For example, a user interface may display the imagery and indicate the boundaries of the ROI. The user interface may display a prototype conversion function similar to the ones shown in FIG. 2 and may allow a user to edit the conversion function and see (e.g., in real time) the effect on the image. For example, the user may add control points to a conversion function graph and/or move control points to change the shape of the curve. In this way, a user may interactively design a conversion function which emphasizes the details important to the user.

Tone Mapping.

Bit depth conversions can be used as a type of tone mapping. A tone mapping maps one or more components of a pixel to different values. For example, a tone mapping may be used to increase the overall brightness of an image (e.g. a frame in a video) by increasing the luma component at each pixel, or may decrease the overall brightness of the image by decreasing the luma component at each pixel. Such tone mappings may be implemented using gamma correction, such that an output luma value $Y'_{out}$ is generated from an input luma value $Y'_{in}$ according to the function $$Y'_{out} = Y'^{\gamma}_{in},$$

where values of $\gamma > 1$ tend to darken the image (and to make details in bright regions more distinguishable), and values of $\gamma < 1$ tend to lighten the image (and to make details in dark regions more distinguishable). Tone mappings may also be applied to chroma components or to a combination of luma and chroma components. Tone maps may be global (such that the same function may be applied to every pixel), or they may be local (such that the function applied to a pixel depends in part on what area or region of the image contains the pixel, and/or on the values of nearby pixels). Numerous types of tone mapping are known to those skilled in the art and can be defined on an ad hoc basis (e.g. using control points). In exemplary embodiments, tone maps are generated using the techniques described in R. Mantuik et al., referenced above.

Where the number of bits in each of the input pixel values of a tone mapping is different from the number of bits in each output pixel value, the tone mapping operates as a bit depth conversion. Thus, tone mapping and bit depth conversion may be performed together in a single step, or they may be performed sequentially (in either order).

Overview of Exemplary Embodiment.

Exemplary systems and methods disclosed herein enable the client to request and receive video streams in which one or more selected ROIs may be displayed with a tone mapping that is different from a default tone mapping displayed in other regions. These different tone mappings can be used for various purposes, such as to highlight particular objects (such as people) of interest in a video or to improve visibility of light or dark features in different areas of the video. Systems and methods disclosed herein further operate to manage the transmission bandwidth from the server to the client and to limit the number of pixels that are encoded or re-encoded by the server. In some such embodiments, each video frame is partitioned into independent slices, and the slices that contain pixels within an ROI are provided as alternative encoded slices that the client can receive.

Figure 10:
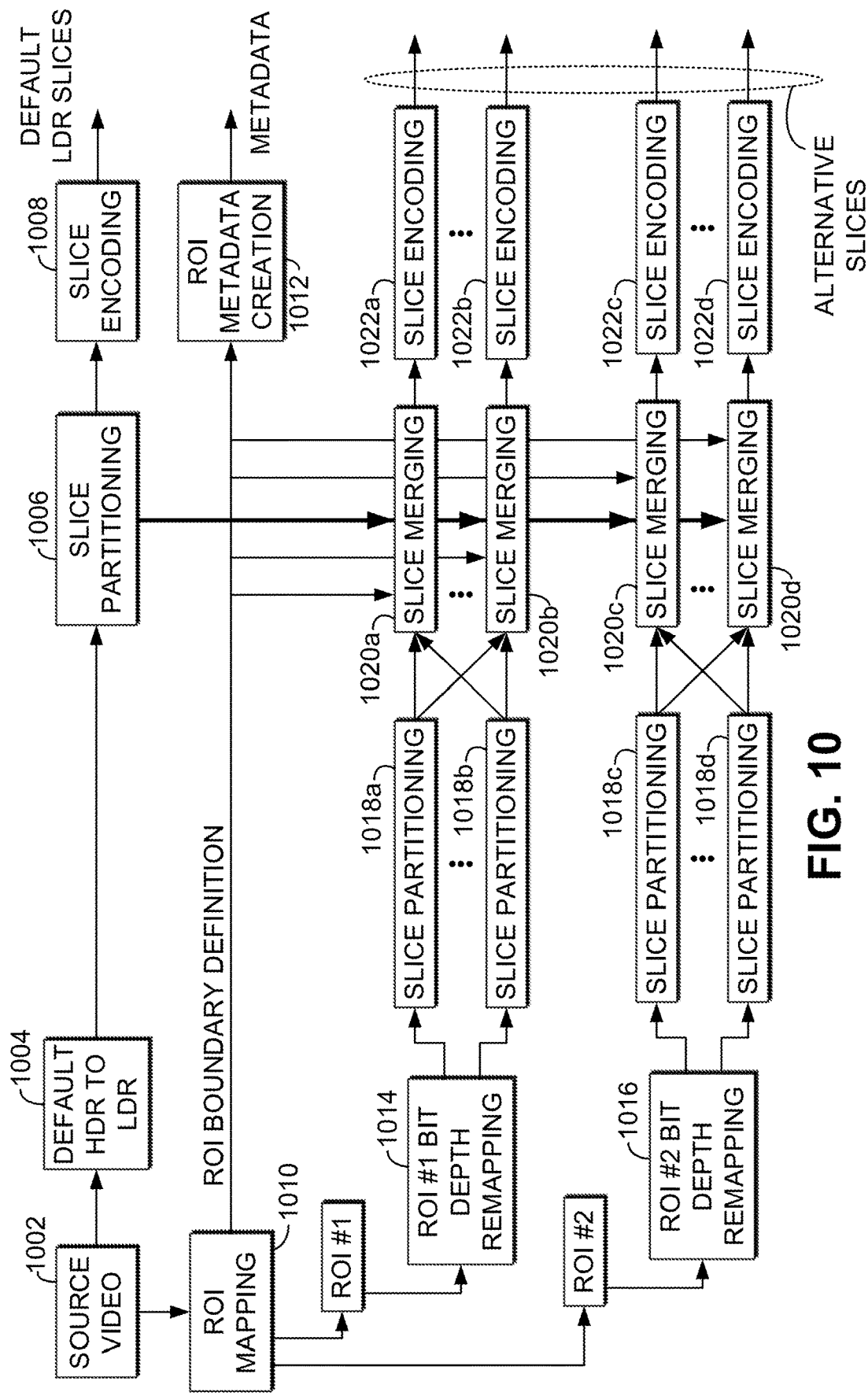
FIG. 10 is a functional block diagram illustrating a method of generating alternative video streams with highlighted regions of interest using a plurality of slices.

FIG. 10 illustrates a functional architecture of an exemplary server/encoder system, in which an example image with two ROIs is processed. A native high bit depth signal 1002 is captured. The client device is only capable of a lower bit depth. Different ROIs in the video frame can benefit from different bit depth transfer functions. In this embodiment, a default high-bit-depth to low-bit-depth conversion 1004 is performed to provide one viewing option. The video frames are then partitioned into independent slices (step 1006) and encoded independently by a slice encoder 1008. For good performance with typical video compression standards such as MPEG2, MPEG4, H.264, H.265 and others, slice boundaries may be aligned along the borders of 16×16 blocks of pixels.

In this embodiment, ROIs in the video frame are identified (step 1010), and metadata is created (step 1012) to notify the client about the availability of different ROIs, and what different tone mappings are available for each ROI. Each ROI may be remapped (steps 1014, 1016) using different bit depth conversion functions (or tone mappings), or the same bit depth remapping may be applied to all regions of interest. These conversions may be used to enhance shadow or bright areas and/or to provide better mappings for different client display types or viewing environments, among other uses.

The ROIs are partitioned into slices (steps 1018a-d) of the same pixel dimensions and coordinates as the default video encoding. For each ROI remapping, the pixels in the ROI and the pixels generated using the default remapping for each slice are merged (steps 1020a-d) so that the ROI pixels are replaced in the slice (e.g. in the image area to be covered by the encoded slice) with the alternative-remapping ROI pixels. Non ROI pixels are not replaced. Each slice is encoded (steps 1022a-d). In an ABR system such as DASH (dynamic adaptive streaming for HTTP), each slice may be ABR encoded into different resolutions and/or bit rates.

In response to a client request for the default video stream, the slices generated using the default mapping are delivered to the client. In some embodiments, the server concatenates the encoded slices into a video frame bit stream so that a single stream is sent for each frame. In alternative embodiments, the individual slices are sent to the client, and the client uses these slices to compose the frame.

In response to the client requesting a specific mapping for a region of interest, the corresponding slices are sent to the client along with non-ROI default mapping slices. In a case where the ROIs move spatially over time, different slices may be used in different frames (e.g. slices which contain all or part of the tone-map enhanced version of a selected ROI may be sent to the client, and the set of such slices may vary frame-by-frame as the ROI size, shape, and/or position vary). The server uses the correct slices for each ROI mapping that is requested by the client.

In some embodiments implemented in ABR systems, the period of the ABR segments encoded determines the time latency when a client can switch from receiving different ROI mappings. That is, once the client requests a different remapped ROI, the client does not receive that new version of the video sequence until the next ABR segment period. In other embodiments, fast stream-switching techniques may be used to enable clients to switch more quickly to a different ROI stream.

Figure 11:
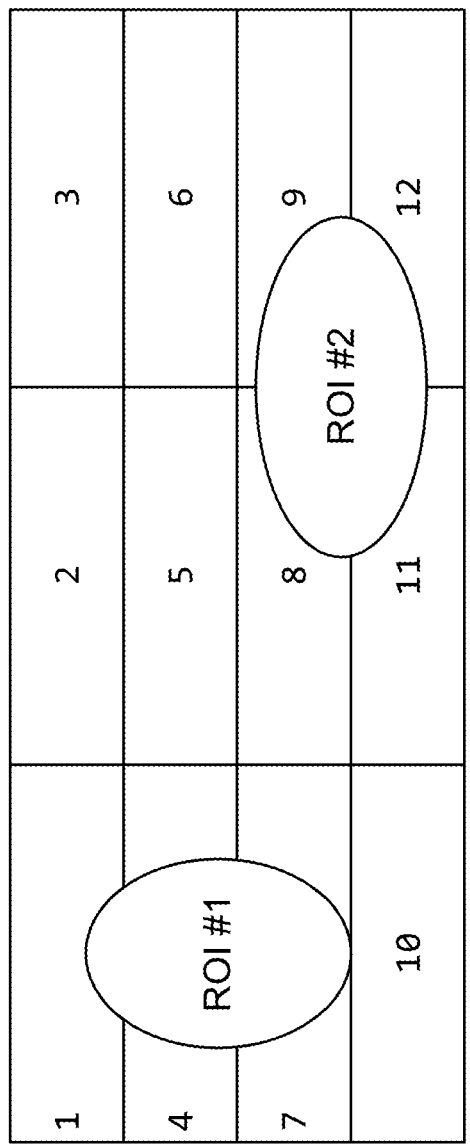
FIG. 11 is a schematic illustration of regions of interest in a video that include a plurality of slices.

An example video frame is shown in FIG. 11. This example video frame has twelve slices and two ROIs: ROI #1 and ROI #2. In an exemplary embodiment, the default mapping encodes the frame into twelve slices. For each remapping of ROI #1, slices 1, 4, 7 are merged with default mapping pixels, and then encoded as alternative slices. For each ROI #2 remapping, slices 8, 9, 11, 12 will be merged with default mapping pixels, and then encoded as alternative slices. In an exemplary merge process, the merged slice may be constructed using the remapped pixels wherever the ROI intersects with the slice and using the default-mapped pixels elsewhere. As the ROI moves spatially over time, different slices may be used to cover the ROI.

Over time, as the ROIs move within the spatial frame, the server may provide the proper slices to a client requesting specific ROI mappings. Over a typical two-second ABR segment duration, the ROI slice location may change significantly. The server thus provides the proper slices in sequence to the client (composed in a frame).

In the case where more than one ROI is contained in the slice, then the slice merging may merge slices from the default, ROI #1, ROI #2. For example, this may create a slice suitable for the case where the user of the client device selects both ROI #1 and ROI #2 for highlighting. This creates an additional slice to encode, which may be in addition to alternative versions of the slice which highlight only ROI #1 and/or ROI #2.

Metadata describing the ROI may be included in each video frame user data enabling the client to provide user interface information and/or to use the information for display.

With multiple clients requesting different ROI mappings, the server thus provides custom streams to clients based on the client requests.

Each client may decode the slices and compose a frame just as a conventional decoder client. In an exemplary embodiment, the client retrieves metadata (such as a manifest file) that describes the available ROIs and bit depth mappings. In a DASH ABR system, this metadata may be provided in a media presentation description (MPD). The client may continue to receive a default stream or may request streams in which a selected mapping is applied to a selected ROI. Selection may be made automatically by a client playback device (e.g. based on display type, viewing conditions, or the like), or selection may be made manually by a user (e.g. from a menu). The client receives and decodes the selected stream.

Overview of Client-Side Mapping Selection.

In exemplary systems and methods disclosed herein, a client requests and receives a desired video stream. Along with the requested stream, the client also receives (1) information identifying one or more regions of interest with the stream, and (2) information identifying one or more tone mappings to apply to the region or regions of interest. The information identifying the region or regions of interest may be, for example, coordinates demarcating the boundaries of each respective region of interest, among other options described in greater detail below. Information identifying the tone mappings may include information identifying the type of tone mapping as well as information identifying parameters of the tone mapping, as described in greater detail below. In some embodiments, the information on the region(s) of interest and the tone mapping(s) is provided on a frame-by-frame basis and may be provided in-band (e.g. in the user data of the video frame within encoded media segments delivered to the client), or out of band in a separate ROI metadata file retrievable by the client. In some embodiments, the information on the region(s) of interest and the tone mappings may be provided in a manifest file such as a DASH Media Presentation Description (MPD) file. The tone mapping information may be retrieved from the same server as the video stream (e.g. from a server in a content distribution network) or from a different server.

In response to a determination to apply a tone mapping to one or more of the regions of interest, e.g. because of a user selection of that region (or those regions) of interest, the client device applies the tone remapping or remappings identified in the received information to the associated regions of interest. Areas of the video frame outside any selected region of interest are not remapped. The client device displays (or causes to be displayed) the video with remapped region or regions of interest.

In some embodiments, the client device collects information regarding viewing conditions (e.g. the type of display device and/or the ambient illumination level) and sends that information to a server, and the tone mapping information that is sent to the client is generated or selected by the server based at least in part on the reported viewing conditions. The tone mappings can be used for various purposes, such as to highlight particular objects (such as people) of interest in a video or to improve visibility of light or dark features in different areas of the video. Selection of Region of Interest. Selection of Region of Interest.

The regions of interest may be defined manually. For example, a human content producer or artist may trace the regions of interest on a displayed frame of content in a user interface, and the traced outline may be used to define the region of interest. Alternately, the regions of interest may be identified automatically. For example, an edge detection algorithm may be used to detect strong edges which may represent region boundaries. For another example, the image may be divided into patches (e.g., regular patches or blocks) and a local histogram may be generated from the pixels in each patch. A comparison or clustering algorithm may be used to merge patches with similar histograms. If desired, merging may be restricted to spatially neighboring patches to produce spatially contiguous regions. This technique may be used to identify regions with similar pixel value distributions and regions of interest. Another example uses an object detection/segmentation algorithm to identify objects of interest, and the image region occupied by the object may be used as an ROI. In each case, the ROI may occupy an arbitrary shape, or it may be restricted to a rectangular shape, elliptical shape, or other predefined shape.

An ROI may be generated for a particular image (e.g., at a particular point in time), or it may span a range of time. In the latter case, the boundaries which define the ROI (or alternately, the footprint of the ROI in the image) may vary across time. For example, an ROI may track an object which changes size, changes shape, or moves across the screen.

Another option is to identify regions of interest semi-automatically. For example, an automatic segmentation or clustering algorithm (e.g., as described above) may create an initial segmentation of the imagery into regions of interest, and a user (such as an artist or content producer) interacts with this segmentation via a UI. The user selects which areas to designate as regions of interest and may edit the boundaries of those ROIs (e.g., by adding or moving segmentation boundaries, or by merging multiple regions). Manual editing may be employed, for example to refine or alter the results produced by automatic algorithms.

Selection and Application of Different Tone Maps in Different Regions.

Figure 3:
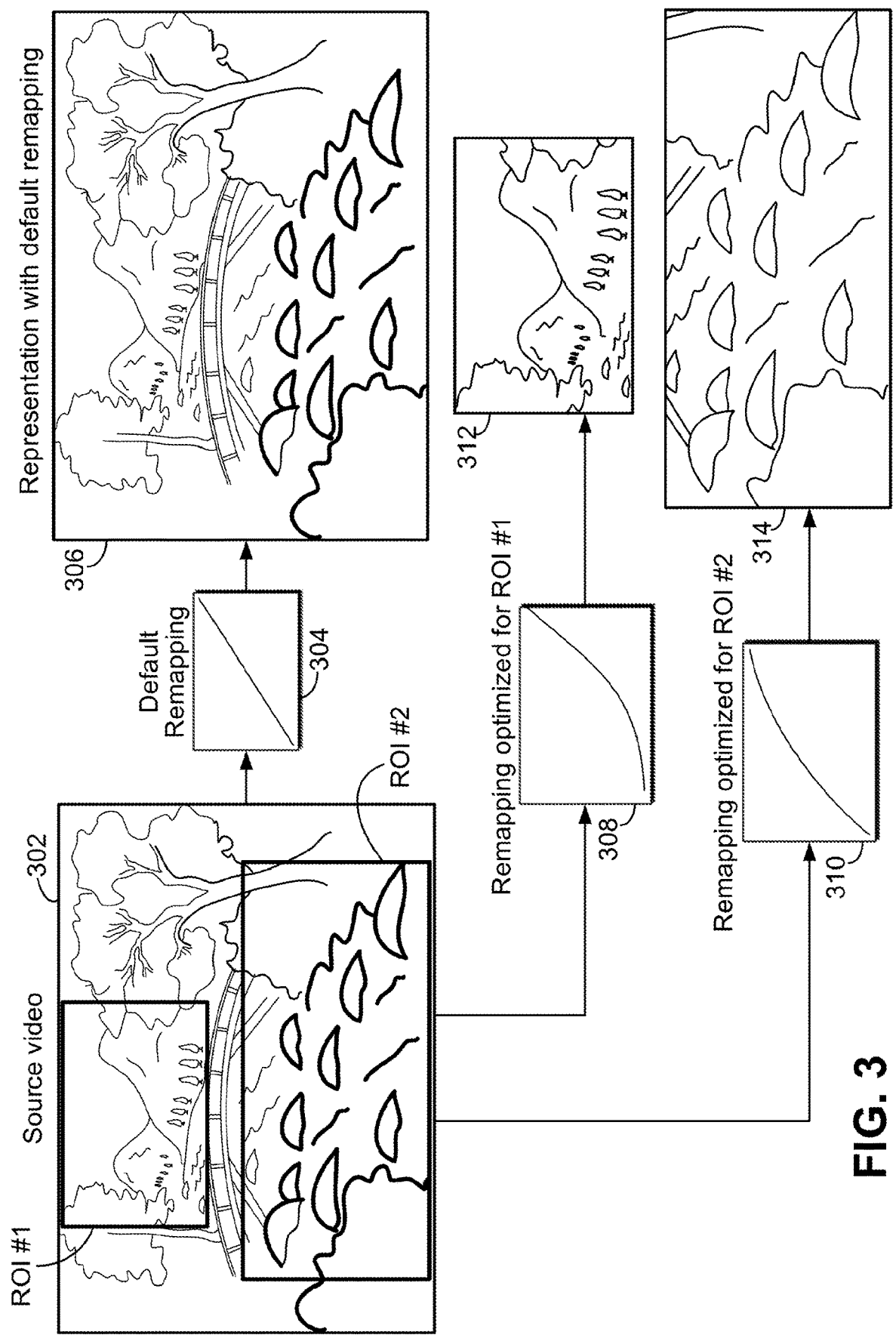
FIG. 3 is a schematic diagram illustrating application of different tone maps to different regions of interest (ROIs) in a source video.

FIG. 3 is a schematic illustration of an exemplary ROI selection process. A complete frame of video 302 may include two regions of interest, ROI #1 and ROI #2. In the example of FIG. 3, ROI #1 is a region that includes brightly-lit mountaintops, and ROI #2 is a region that includes a shaded brook. The position and dimensions of these regions of interest may be signaled to the client, e.g. in a manifest file. In some embodiments, the regions of interest may be defined on the client side (e.g. based on user input through a UI). The client may initially request and receive from a server a default representation 305 of the video, where the default representation is generated with a default tone map 304 (e.g. without explicit application of a tone map to change pixel values). In some embodiments, this default representation 306 may be generated using a default remapping from a higher bit depth source video to a lower bit depth suitable for display. Under some conditions (e.g. ambient brightness, or different display technologies), the brightly-lit features in the mountaintops and/or the dimly lit regions of the brook may be difficult to discern.

To improve visibility under current viewing conditions, a client may act in response to a cue (e.g. a user input, or automatic detection of an ambient illumination level) to request a representation with one or more different tone mappings (other than the default) applied in different regions of interest. In some embodiments, the client may act in response to the cue to itself apply a tone mapping (other than the default) to one or more regions of interest. The tone mapping may be selected to improve the visibility of the video under current viewing conditions, to improve the visibility within a selected region of interest, or to facilitate identification of the region of interest.

In some embodiments, a user provides input to select a particular region of interest. For example, if a user selects ROI #1, a tone mapping 308 may be selected (or locally applied by the client) that optimizes the visibility of features in the mountaintops. This tone mapping may be, for example, a remapping that provides greater detail in brighter regions. In some embodiments, the tone mapping (e.g. parameters that define the tone mapping) is received by the client from the server, along with the definition of ROI 1, as described herein. In some embodiments, this optimized remapping is applied only to pixels in ROI #1, with the remaining pixels in the frame being remapped to the display bit depth using a default tone mapping (such as a linear function). In other embodiments, this tone mapping may be a mapping that is applied to the entire frame. As a result of applying the mapping to the entire frame, some detail may be lost in shadowed regions (e.g. some banding may be visible in ROI #2), but the mountaintop features in ROI #1 will be visible with higher quality (312).

If a user selects ROI #2, a tone mapping may be selected (or applied by the client) that optimizes the visibility of features in the shaded brook. This mapping may be, for example, a mapping that provides greater detail in darker regions. The tone mapping for ROI #2 (e.g. parameters that define the tone mapping) may be received by the client from the server, along with the definition of ROI #2, as described herein. In some embodiments, this mapping is applied only to pixels in ROI #2, with the remaining pixels in the frame being mapped using a default tone mapping, such as a linear function. In other embodiments, this mapping may be a mapping that is applied to the entire frame. As a result of applying the mapping to the entire frame, some detail may be lost in brighter regions (e.g. some banding may be visible in ROI 1), but the shadowy brook features in ROI 2 will be visible with higher quality (314).

In some embodiments, a user may select both ROI #1 and ROI #2. In this case, separate tone mappings may be applied to those regions (by the client or by the server) as described above. In other embodiments, if a user selects both ROI #1 and ROI #2, a tone mapping may be selected that balances optimization for visibility of features in the brook and the mountaintops. This mapping may be, for example, a mapping that provides greater detail in the brightest and in the darkest regions. This mapping may be a mapping that is applied to the entire frame. As a result, some detail may be lost in mid-tone regions (e.g., some banding may be visible outside ROI #1 and ROI #2), but the mountaintop region of ROI #1 and brook region of ROI #2 will be displayed with higher quality (though perhaps not with the same quality that could be seen if one of those regions was selected individually).

Exemplary Manifest.

Embodiments disclosed herein may be employed in an MPEG-DASH ABR video distribution system. Provided below is an exemplary DASH MPD that may be used in some embodiments to convey information regarding the availability of different ROIs and different tone mappings available for those ROIs. Information analogous to that provided in the example MPD may be provided in-band (e.g. in the user data of the video frame within encoded media segments delivered to the client), or in a separate ROI metadata file retrievable by the client. The ROI parameters described here may be provided periodically or on a frame-by-frame basis, to support the ROI moving spatially over time. Therefore, the client on startup retrieves the metadata on ROIs from the MPD, but once decoding frames, the client may check each frame ROI user data (which may be available in-band or from a separate metadata file, if it is not present in the MPD) to update its user interface or other algorithms related to ROI selection and display.

The following parameters are used in the exemplary MPD:

Num_Objects: Range 0-255, defines the number of objects to be defined in the current list. If Num_Objects is greater than zero, then the following parameters are provided for each of the Num_Objects objects, each of which may pertain to an ROI.

Object_ID: Range 0-255. This syntax element provides a unique identifier for each ROI object.

Object_x_position[n]: For each object ID n, the x position of the object bounding box.

Object_y_position[n]: For each object ID n, the y position of the object bounding box.

Object_x_size[n]: For each object ID n, the x_dimension of the object bounding box.

Object_y_size[n]: For each object ID n, the y_dimension of the object bounding box.

Object_Mapping]n]: Defines a ROI unique bit depth mapping. If the value is 0 then the associated Representation has default ROI mapping common to the video frame. A value greater than zero indexes the ROI mappings.

Object_UserData[n]: For each object ID n, proprietary User Data can be included to be used by the Client to present User Interface Selection Criteria for the Object.

Object x,y position and size may be provided in pixel units that correspond to the first-listed representation in the appropriate adaption set. For secondary representations (if they exist), the Object x,y size and position values are scaled to the secondary representations picture dimensions with a linear scale factor.

Each representation may be generated with different ROI bit depth mappings. These mappings typically increase detail in dark or light areas compared to the overall intensity of the video frame size.

A client device by receiving an MPD can represent the ROI on the user interface in a variety of ways. The Supplemental Property of the of an adaption set indicates to the client how many ROIs are available. Object_UserData may be used by the client to display information describing aspects of the ROI. For example, in a sporting event this can be specific player information.

If more than one ROI is available with different mappings, then combinations of different ROI mappings may also be available. For example, with two ROIs, this would result in four representations: default (no remappings), only ROI #1 remapped, only ROI #2 remapped, and both ROIs remapped. If each ROI has multiple remappings available, the number of representations increases.

In addition to the different mappings for the ROIs, the overall video frame mapping can be optimized for specific viewing conditions (bright room, dark room, etc.) or for specific viewing devices such as LED, CRT, Plasma, or other screen types. Viewing condition and ViewingDeviceType parameters can be transmitted for each representation and in combination with different ROI mappings.

The following is an example of an MPD that may be used in an embodiment in which there is one ROI with one available remapping:

```
<?xml version="1.0" encoding="UTF-8"?>
<MPD
..
<ProgramInformation>
    <Title>Example of a DASH Media Presentation Description for ROI HDR mappings</Title>
</ProgramInformation>
<Period>
<AdaptationSet segmentAlignment="true" subsegmentAlignment="true" subsegmentStartsWithSAP="1">
<Role schemeIdUri="urn:mpeg:dash:role:2011" value="main"/>
<SupplementalProperty schemeIdUri="urn:mpeg:dash:rtvideoparam:2014" value="1920,1080" Num_Objects =
"1" Object_ID="1" Object_x_position[1]="456" Object_y_position[1]="800" Object_x_size[1]="640"
Object_y_size[1]="480" Object_UserData[1]="Quarterback" />
<Representation mimeType="video/mp4" codecs="avc1.644029" width="1920" height="1080"
bandwidth="1055223" Object_Mapping[1]="0" >
    <SegmentList timescale="90000" duration="900000">
        <RepresentationIndex sourceURL="representation-index.sidx"
        <SegmentURL media="segment-1080p.ts"/>
    </SegmentList>
</Representation>
<Representation mimeType="video/mp4" codecs="avc1.644029" width="1280" height="720"
bandwidth="855223" Object_Mapping[1]="0" >
    <SegmentList timescale="90000" duration="900000">
        <RepresentationIndex sourceURL="representation-index.sidx"/>
        <SegmentURL media="segment-720p.ts"/>
    </SegmentList>
</Representation>
<Representation mimeType="video/mp4" codecs="avc1.644029" width="1920" height="1080"
bandwidth="1055223" Object_Mapping[1]="1" >
    <SegmentList timescale="90000" duration="900000">
        <RepresentationIndex sourceURL="representation-index.sidx"
        <SegmentURL media="segment-1080p-EnhanceRegion1.ts"/>
    </SegmentList>
</Representation>
<Representation mimeType="video/mp4" codecs="avc1.644029" width="1280" height="720"
bandwidth="855223" Object_Mapping[1]="1" >
    <SegmentList timescale="90000" duration="900000">
        <RepresentationIndex sourceURL="representation-index.sidx"/>
        <SegmentURL media="segment-720p-EnhanceRegion1.ts"/>
    </SegmentList>
</Representation>
</AdaptationSet>
```

The following is an example of an MPD that may be used in an embodiment in which Two ROIs are available. In this example, eight total representations are available: four remapping variations (default, remapping of ROI #1 only, remapping of ROI #2 only, and remapping of both ROI #1 and ROI #2) are each available at two different resolutions (1080p and 720p):

```
<?xml version="1.0" encoding="UTF-8"?>
<MPD
..
<ProgramInformation>
<Title>Example of a DASH Media Presentation Description for two ROI HDR mappings</Title>
</ProgramInformation>
<Period>
<AdaptationSet segmentAlignment="true" subsegmentAlignment="true" subsegmentStartsWithSAP="1">
<Role schemeIdUri="urn:mpeg:dash:role:2011" value="main"/>
<SupplementalProperty schemeIdUri="urn:mpeg:dash:rtvideoparam:2014" value="1920,1080" Num_Objects =
"2" Object_ID="1" Object_x_position[1]="456" Object_y_position[1]="800" Object_x_size[1]="640"
Object_y_size[1]="480" Object_UserData[1]="Quarterback" Object_ID="2" Object_x_position[2]="1020"
Object_y_position[2]="720" Object_x_size[2]="380" Object_y_size[2]="210" Object_UserData[2]="Wide
Receiver" />
<Representation mimeType="video/mp4" codecs="avc1.644029" width="1920" height="1080"
bandwidth="1055223" " Object_Mapping[1]="0" Object_Mapping[2]="0" >
    <SegmentList timescale="90000" duration="900000">
        <RepresentationIndex sourceURL="representation-index.sidx"
```

```xml
        <SegmentURL media="segment-1080p-default.ts"/>
    </SegmentList>
</Representation>
<Representation mimeType="video/mp4" codecs="avc1.644029" width="1280" height="720"
bandwidth="855223" " Object_Mapping[1]="0" Object_Mapping[2]="0" >
    <SegmentList timescale="90000" duration="900000">
        <RepresentationIndex sourceURL="representation-index.sidx"/>
        <SegmentURL media="segment-720p-default.ts"/>
    </SegmentList>
</Representation>
<Representation mimeType="video/mp4" codecs="avc1.644029" width="1920" height="1080"
bandwidth="1055223" " Object_Mapping[1]="1" Object_Mapping[2]="0" >
    <SegmentList timescale="90000" duration="900000">
        <RepresentationIndex sourceURL="representation-index.sidx"
        <SegmentURL media="segment-1080p-EnhanceObject1.ts"/>
    </SegmentList>
</Representation>
<Representation mimeType="video/mp4" codecs="avc1.644029" width="1280" height="720"
bandwidth="855223" " Object_Mapping[1]="1" Object_Mapping[2]="0" >
    <SegmentList timescale="90000" duration="900000">
        <RepresentationIndex sourceURL="representation-index.sidx"/>
        <SegmentURL media="segment-720p-EnhanceObject1.ts"/>
    </SegmentList>
</Representation>
<Representation mimeType="video/mp4" codecs="avc1.644029" width="1920" height="1080"
bandwidth="1055223" " Object_Mapping[1]="0" Object_Mapping[2]="1" >
    <SegmentList timescale="90000" duration="900000">
        <RepresentationIndex sourceURL="representation-index.sidx"
        <SegmentURL media="segment-1080p-EnhanceObject2.ts"/>
    </SegmentList>
</Representation>
<Representation mimeType="video/mp4" codecs="avc1.644029" width="1280" height="720"
bandwidth="855223" Object_Mapping[1]="0" Object_Mapping[2]="1" >
    <SegmentList timescale="90000" duration="900000">
        <RepresentationIndex sourceURL="representation-index.sidx"/>
        <SegmentURL media="segment-720p-EnhanceObject2.ts"/>
    </SegmentList>
</Representation>
<Representation mimeType="video/mp4" codecs="avc1.644029" width="1920" height="1080"
bandwidth="1055223" Object_Mapping[1]="1" Object_Mapping[2]="1" >
    <SegmentList timescale="90000" duration="900000">
        <RepresentationIndex sourceURL="representation-index.sidx"
        <SegmentURL media="segment-1080p-EnhanceBothObjects.ts"/>
    </SegmentList>
</Representation>
<Representation mimeType="video/mp4" codecs="avc1.644029" width="1280" height="720"
bandwidth="855223" Object_Mapping[1]="1" Object_Mapping[2]="1" >
    <SegmentList timescale="90000" duration="900000">
        <RepresentationIndex sourceURL="representation-index.sidx"/>
        <SegmentURL media="segment-720p-EnhanceBothObjects.ts"/>
    </SegmentList>
</Representation>
</AdaptationSet>
```

Exemplary Region of Interest Information.

Various techniques may be employed to convey information regarding the availability of different regions of interest and different tone mappings available for those regions of interest. the information may be provided in-band (e.g. in the user data of the video frame within encoded media segments delivered to the client), or, e.g., in a separate region of interest metadata file retrievable by the client. The region of interest parameters described here may be provided periodically or on a frame-by-frame basis, to support the region of interest moving spatially over time. The following exemplary parameters may be used to provide data regarding regions of interest.

Num_Objects: Range 0-255, defines the number of objects to be defined in the current list. If Num_Objects is greater than zero, then the following parameters are provided for each of the Num_Objects objects, each of which may pertain to an ROI.

Object_ID: Range 0-255. This syntax element provides a unique identifier for each ROI object.

Object_x_position [n]: For each object ID n, the x position of the object bounding box.

Object_y_position[n]: For each object ID n, the y position of the object bounding box.

Object_x_size[n]: For each object ID n, the x_dimension of the object bounding box.

Object_y_size[n]: For each object ID n, the y_dimension of the object bounding box.

Object_Mapping]n]: Defines a ROI unique bit depth mapping. If the value is 0 then the associated Representation has default ROI mapping common to the video frame. A value greater than zero indexes the ROI mappings.

Object_Mapping_Parameters[n]: Defines Tone Mapping Parameters which may define a tone remapping function to be applied by the client for the ROI. The specific tone mapping parameters provided for an ROI may depend on the type of remapping function applied. In some embodiments, multiple remapping functions may be provided for an ROI, in which case multiple object mapping parameter sets may be provided for the ROI.

Object_UserData[n]: For each object ID n, proprietary User Data can be included to be used by the Client to present User Interface Selection Criteria for the Object.

Object x,y position and size may be provided in pixel units that correspond to the first-listed representation in the appropriate adaption set. For secondary representations (if they exist), the Object x,y size and position values are scaled to the secondary representations picture dimensions with a linear scale factor. In some embodiments, the dimensions and boundaries of the region of interest are determined and delivered to the client in real time.

A client device that receives region of interest data can represent the region of interest on the user interface in a variety of ways. For example, Object_UserData may be used by the client to display information describing aspects of the region of interest. For example, in a sporting event, this can be specific player information.

Server Configuration of Remappings.

In an exemplary embodiment, the server informs the client about the availability of both a standard bit depth (e.g. 8 bit) version and a high bit depth version (e.g. 12 bit) of the video content, e.g. in a manifest such as an MPEG-DASH MPD. The manifest may identify a plurality of representations for both the standard-bit-depth and the high-bit-depth versions of the content (with different representations having, for example, different bitrates). In an exemplary architecture, tracking of a region of interest (including an object of interest) is performed at the server. This information is carried inband to the client. In addition, the server generates tone mapping parameters for the regions of interest. The tone mapping parameters may be generated with the objective of improving visibility under the viewing conditions at the client device and may be based on information regarding the viewing parameters as reported by the client device to the server.

These tone mapping parameters are communicated to the client device. The resources of the client device thus need not be dedicated to functions of object tracking or generation/selection of tone remapping parameters, as these functions are performed at the server. The tone remapping itself (using the parameters received from the server) is performed in some embodiments by the client device.

In an exemplary embodiment, parameters used for the tone mapping of an individual region of interest are communicated from the server to the client using the syntax of an H.264 supplemental enhancement information (SEI) message, such as a "Tone mapping information SEI" message where different types of models and parameters are supported as signaled by the syntax element tone_map_model_id, as described in ITU-T H.264 and ISO/IEC 14496-10, Advanced Video Coding for Generic Audiovisual Services MPEG-4 AVC, 2014. In that syntax element, a tone_map_model_id value of 0 corresponds to a linear mapping with clipping; a tone_map_model_id value of 1 corresponds to a sigmoidal mapping; a tone_map_model_id value of 2 corresponds to a user-defined table mapping, a tone_map_model_id value of 3 corresponds to a piece-wise linear mapping. Each of these models has associated parameters that are also included (e.g. included in the communication from the server to the client) to fully describe a tone map. The linear map with clipping is defined by giving maximum and minimum values. The sigmoidal model, S-curve, uses a midpoint, sigmoid_midpoint, and a width, sigmoid_width, together with the formula:

$$f(i) = \text{Round}\left(\frac{2^{target\_bit\_depth} - 1}{1 + \exp\left(\frac{-6*(i - \text{sigmoid\_midpoint})}{\text{sigmoid\_width}}\right)}\right)$$

for $i = 0, \ldots, (2^{coded\_bit\_depth} - 1)$

The model value 2 allows a full user-defined lookup table, while the model value 3 defines a piecewise linear mapping, where the pieces are defined by pivot points which define each linear piece. Other sets of parameters may alternatively be used.

A client device (e.g. an application program running on a client) may receive a manifest (e.g. a DASH MPD) which contains a presentation description advertising one or more alternative bit depth representations. The client may parse the description, and may request, retrieve, and display the content of an available content representation. The client may request and retrieve the full depth version of the stream from the server (using the appropriate MPD description). The server sends to the client (for example on a per-frame basis) information identifying the positions of tracked regions of interest and tone remapping parameters. For example, each tracked region of interest may be associated with one or more tone remapping functions, where each tone remapping function may be represented by a set of tone remapping parameters. The client then performs an appropriate tone remapping function using the remapping parameters on that region of interest. In some embodiments, the tone remapping function may convert the full depth version to a lower bit depth suitable for the bit depth which the client (or a display device connected to the client) is capable of displaying.

In some embodiments, the client requests the full depth version of the content and performs an appropriate bit-depth remapping in response to user input, or based on internal client logic. The bit-depth remapping applied by the client may be suitable for (e.g. optimized for) a region of interest. The bit-depth remapping may be adapted for (e.g. optimized for) a particular display technology. The bit-depth remapping may be adapted for (e.g. optimized for) a set of viewing conditions.

Exemplary Region of Interest (ROI) Tone Remapping System and Method.

Figure 4:
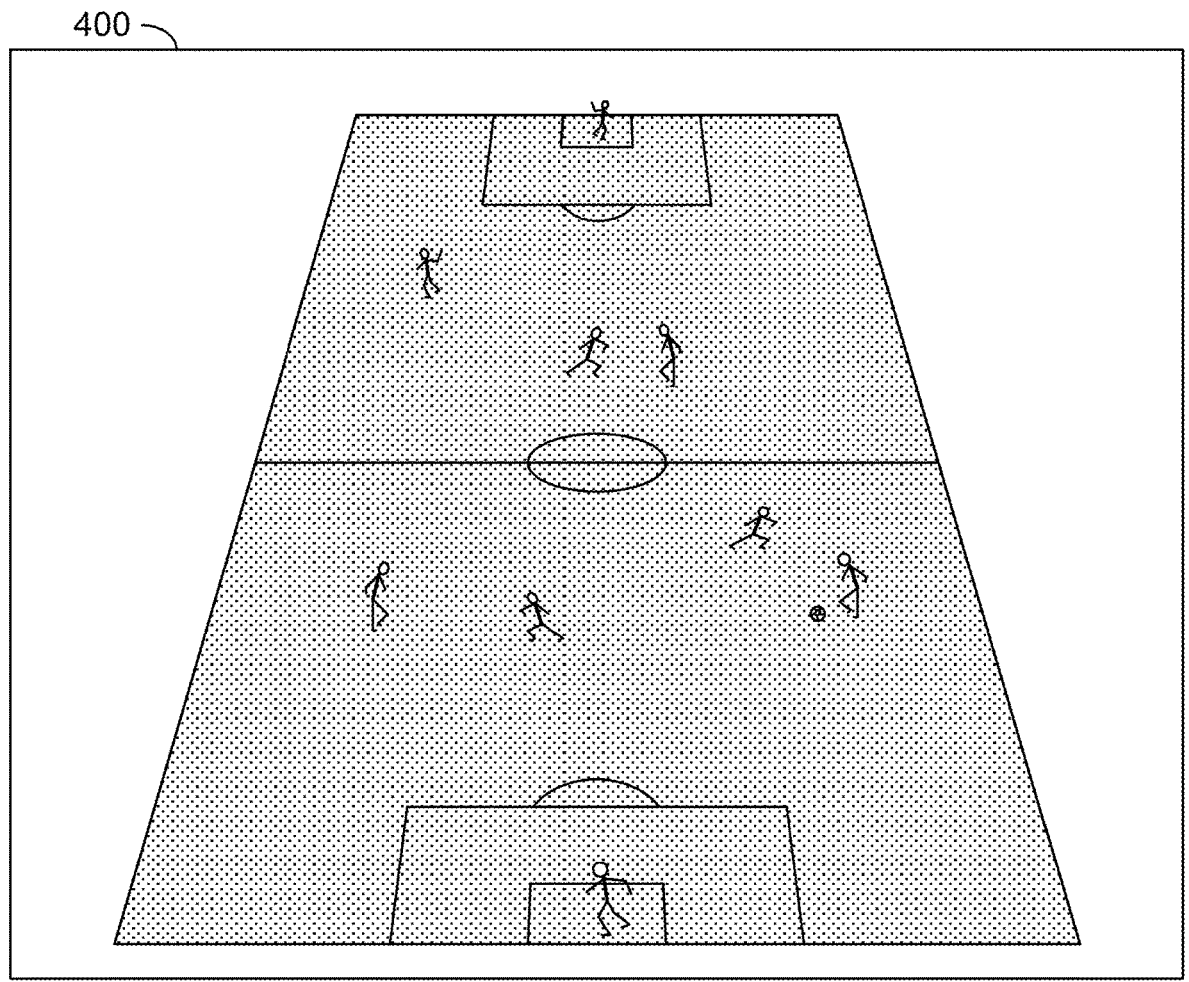
FIG. 4 is a schematic view of a default video displayed without application of a tone map to any region of interest.
Figure 5:
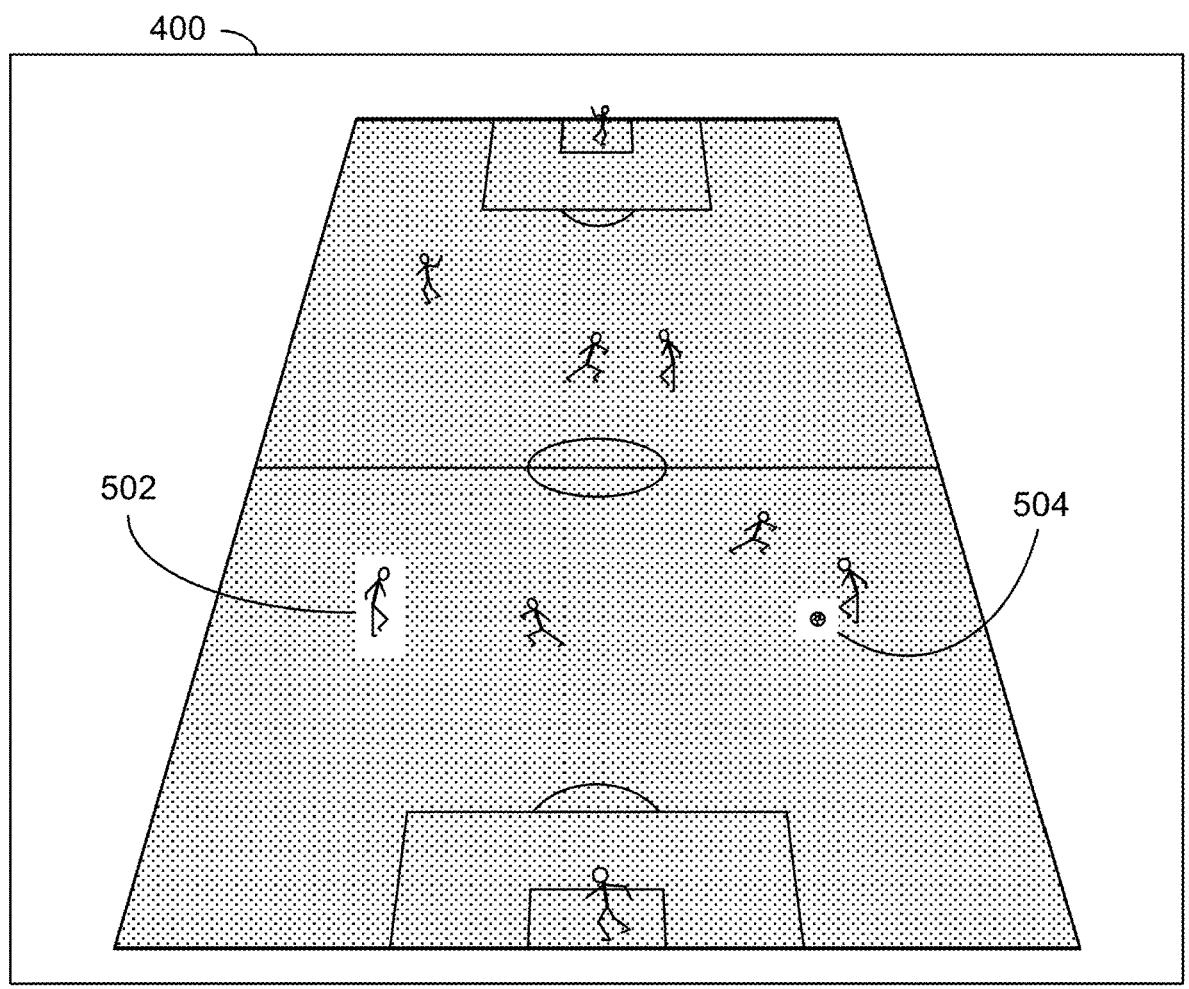
FIG. 5 is a schematic view of a video displayed with a tone map used to highlight a first region of interest (a player) and a second region of interest (a game ball).

An illustration of exemplary operation and use cases for systems and methods disclosed herein is provided with reference to FIGS. 4-8 and 9A-9C. FIG. 4 illustrates a frame 400 in a video of a sporting event as it may appear during viewing of a default video (with a default tone mapping). FIG. 5 illustrates the same frame 400 in which tone remapping has been applied to two regions of interest: a first region of interest 502 corresponding to a player and a second region of interest 504 corresponding to a game ball. The applied remapping in this example has the effect of highlighting the selected player and the game ball. This may result from, for example, a gamma remapping of luma values in which γ<0.

Figure 6:
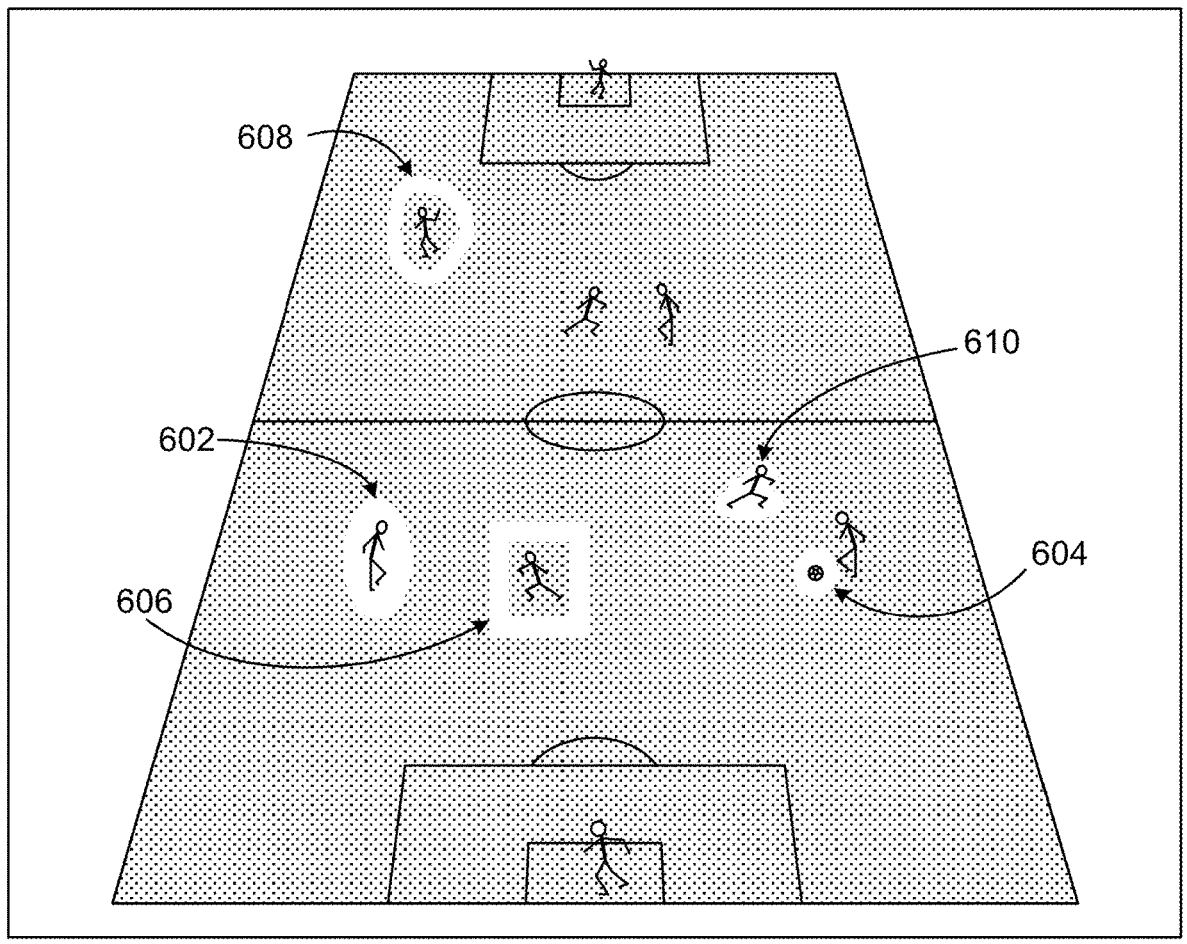
FIG. 6 is a schematic view of a video with tone maps used to highlight various regions of interest, with the regions of interest having a variety of regular and irregular shapes.

FIG. 5 illustrates the use of rectangular regions of interest 502, 504; however, non-rectangular regions of interest may alternatively be used. Exemplary shapes for regions of interest are illustrated in FIG. 6. As seen in FIG. 6, regions of interest may be elliptical (602), circular (604), or may have irregular shapes (610). In some embodiments, the region of interest is a border region (606, 608) that may be positioned around an object that is intended to be highlighted. The use of a border region of interest can attract attention to an object without applying the alternative tone mapping to the object itself. Like other regions of interest, a border region of interest can be provided in a variety of shapes, both regular (606) and irregular (608). For the purposes of this disclosure, the area that is surrounded by a border region of interest but that is not actually part of the border is referred to herein as being outside (or not within) the region of interest. A tone mapping applied to a border region of interest is thus not necessarily applied to the area that is surrounded by the region of interest. Regular geometric region boundaries may be specified in metadata using simple geometric parameters (for example, a circle may be expressed as a center point (cx, cy) and a radius r). Irregular region shapes and boundaries may be expressed using boundary coding methods (which may be lossy or lossless), or by encoding a binary significance map to indicate which pixels are in a particular ROI and which pixels are outside of the ROI.

Figure 7:
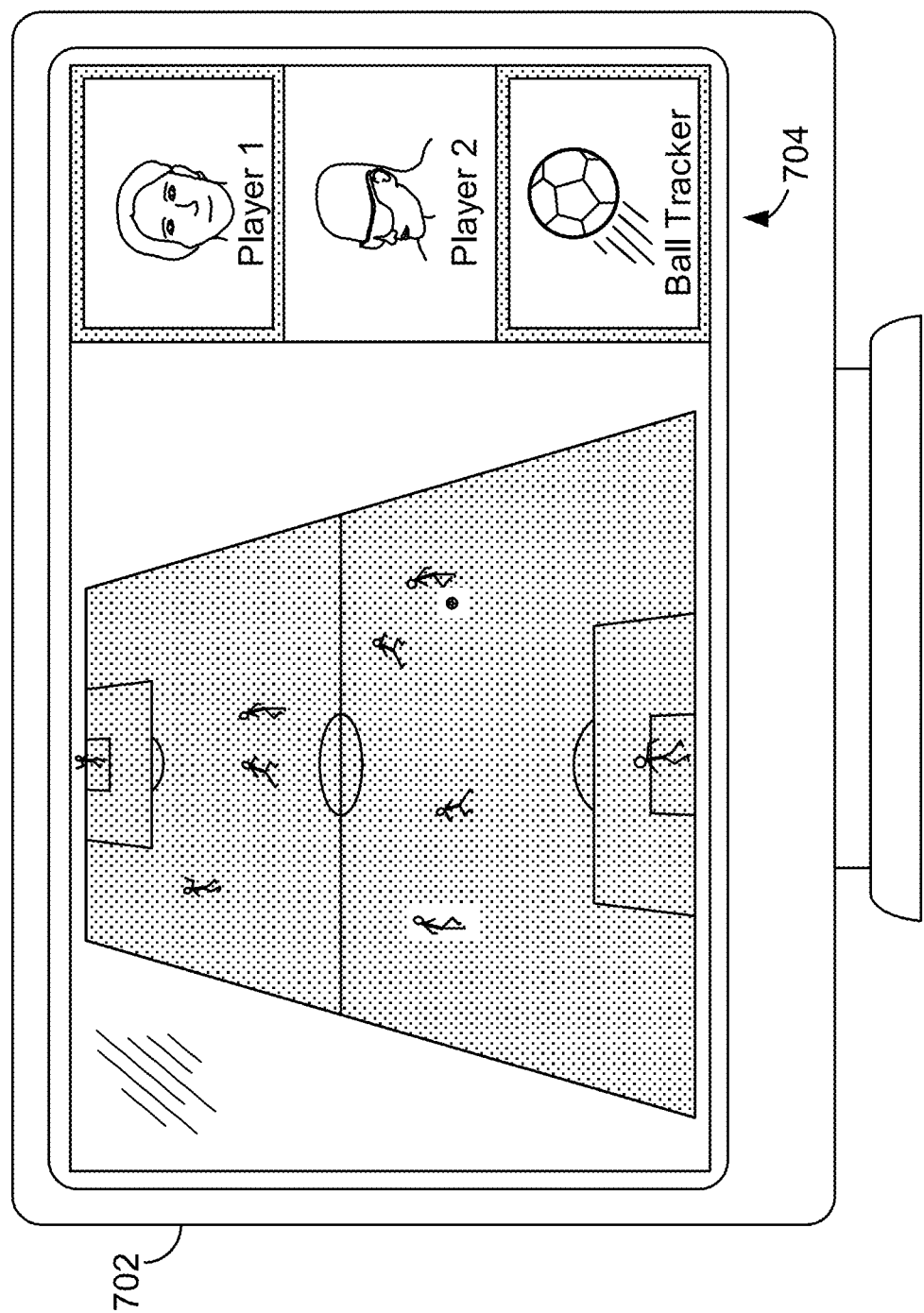
FIG. 7 is a schematic view of a video playback device on which is displayed a video with tone maps used to highlight regions of interest and with a sidebar menu allowing the user to select regions of interest.

FIG. 7 illustrates a display device 702 (e.g. a television or computer monitor) on which a video is being displayed. The display may include a sidebar 704 or other user interface identifying ROIs that are available or selected for remapping. In the example of FIG. 7, Player 1, Player 2, and the game ball are all ROIs for which remapping is available. In this instance, Player 1 and the game ball have been selected for remapping, as indicated by the bolded border around those options. Player 2 has not been selected for remapping. A client device may operate in conjunction with a touchscreen interface, remote control, or other input to allow a user to select or deselect regions of interest. As discussed above, a change in the user selection may become effective only as of the next segment of video retrieved by the client device.

Figure 8:
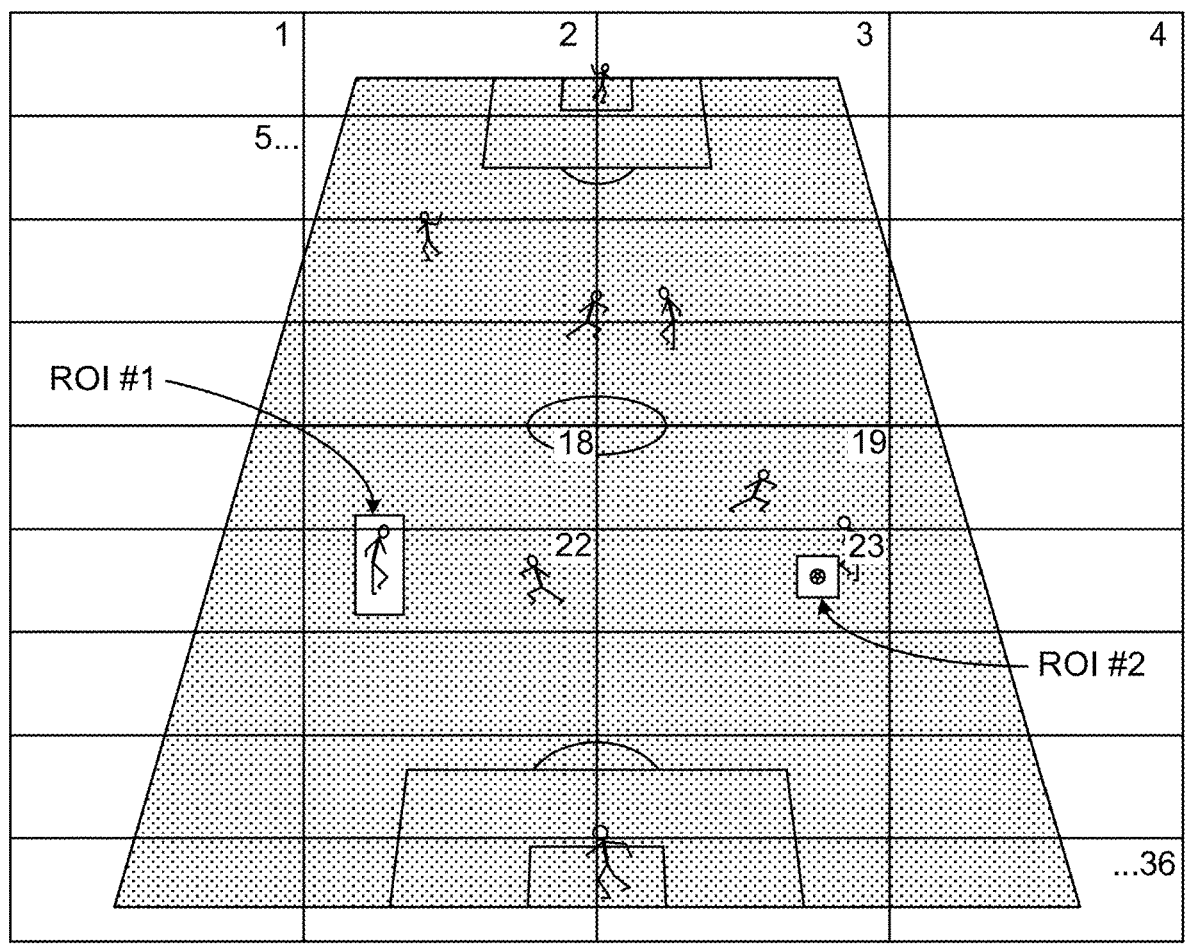
FIG. 8 is a schematic view of a video illustrating the division of the video into a plurality of slices.

FIG. 8 illustrates an exemplary division of the video into a plurality of slices. For the sake of illustration, thirty-six slices are shown, although other numbers and arrangements of slices may be used. As described in greater detail below, division of the video into slices allows an encoder or other server to apply remappings only to those slices in which a region of interest appears. As illustrated in FIG. 8, numerous slices do not contain any region of interest. Tone remapping is not required as to slices in which no region of interest appears. A technique that may be used in some embodiments for slice processing and replacement is that described in Vehkaperä, Janne, and Seppo Tomperi. "Replacing picture regions in H.264/AVC bitstream by utilizing independent slices." Image Processing (ICIP), 2010 17th IEEE International Conference on. IEEE, 2010.

Figure 9A:
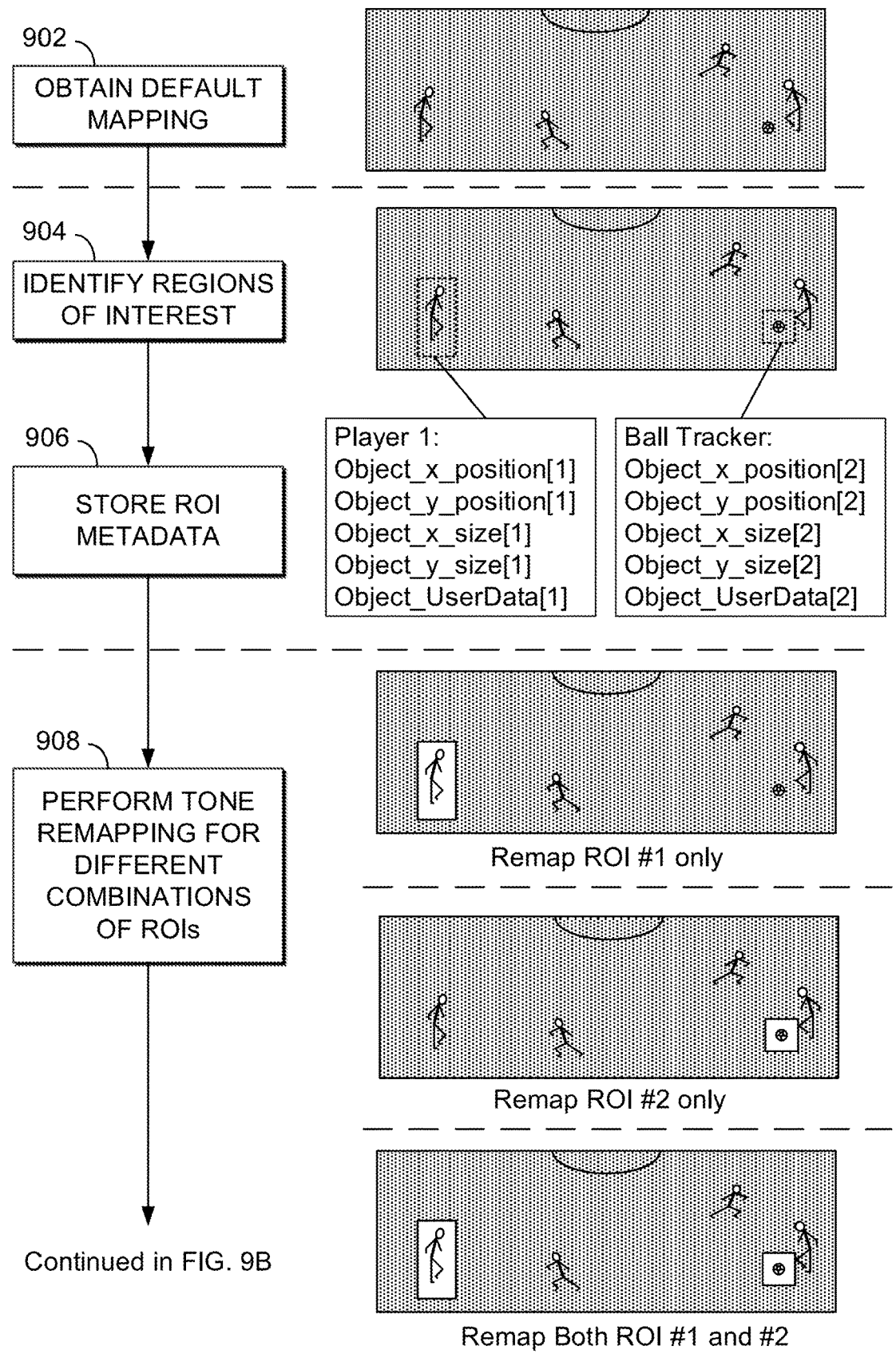
FIGS. 9A-9C are a flow diagram illustrating a method of generating alternative video streams with highlighted regions of interest using a plurality of slices.
Figure 9B:
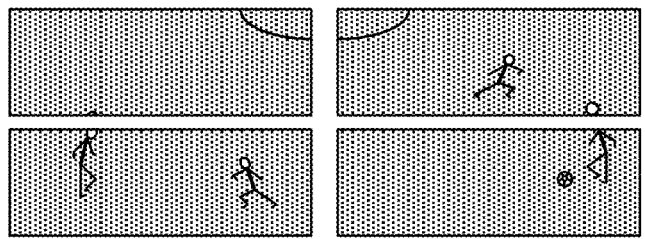
Figure 9B:
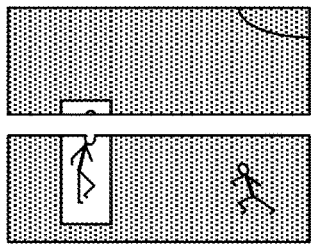
Figure 9B:
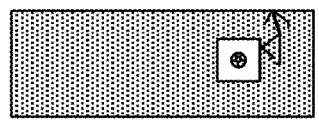
Figure 9B:
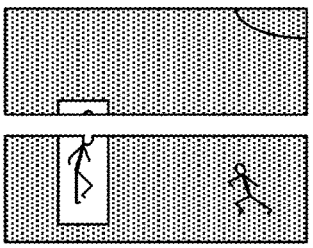
Figure 9B:
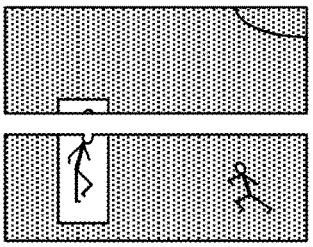
Figure 9C:
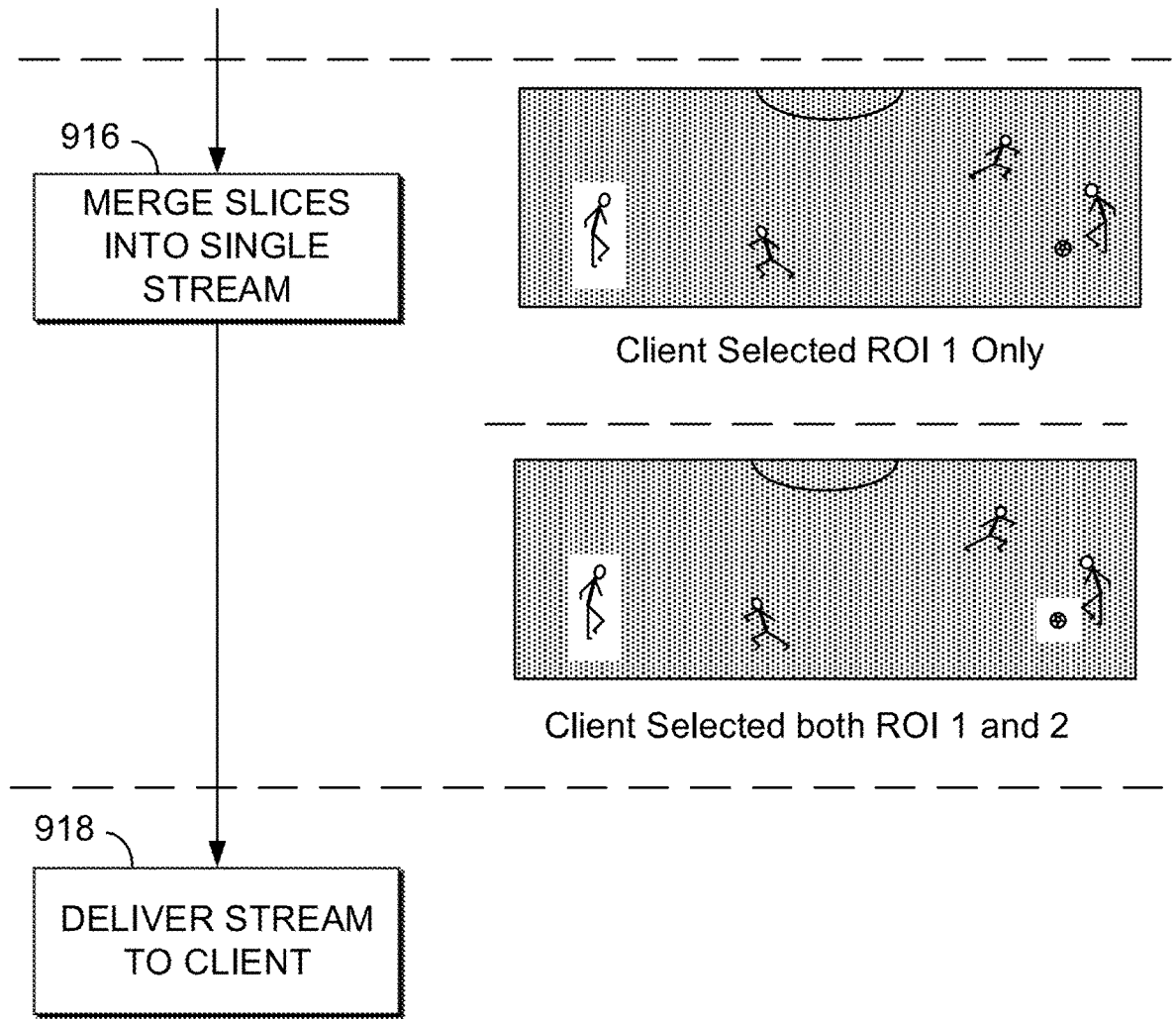

An exemplary method for generating video representations with tone remapping of ROIs is illustrated in FIGS. 9A-9C. In FIG. 9A, a server in step 902 receives video stream with a default mapping. In step 904, regions of interest are identified (e.g. manually or automatically) within the video. Metadata regarding the regions of interest is stored in step 906. This metadata may include information such as the identity of the ROI ("Player 1", "Ball Tracker"), the x and y positions of the ROI, the x and y dimensions of the ROI, and any other information that may be of use (e.g. information on a player's name or position). In step 908, different combinations of tone remappings are performed on the video, such as a remapping of ROI #1 only, ROI #2 only, and both ROI #1 and ROI #2.

As illustrated in FIG. 9B, the exemplary method continues with the partition of the default video stream into separate slices (step 910) and the partition of the remapped streams into slices (step 912). In the illustration of FIGS. 9A-9C, tone remapping is applied to regions of interest in advance of partitioning into slices. In other embodiments, application of tone mappings to regions of interest may be performed after partitioning into slices. In either case, the result is a plurality of video slices, some of which feature no tone remapping and some of which feature tone remapping of one or more regions of interest. It may also be noted that the exemplary regions of interest in FIGS. 8 and 9A-9C are surrounded by a border, unlike the regions of interest in FIGS. 5-7. In some embodiments, a border is provided around each region of interest, and in other embodiments, no border is used. A determination of whether to use a border may be made in response to a user selection or stored user preference.

As shown in FIG. 9B, data is stored in step 914 that associates slices with remappings. For example, each video slice may be assigned a pair of values (N,m), where N is an index indicating the position of the slice within the video and m is an index representing the remappings applied within the slice. In the example of FIG. 8, N runs from 1 to 36. In an illustrative example, slices in which no tone remapping is applied are represented by the index m=0, slices in which only ROI 1 is remapped are indexed by m=1, slices in which only ROI 2 is remapped are indexed by m=2, and slices in which both ROI 1 and ROI 2 are remapped are indexed by m=3. The data that associates slices with remapping may be used to limit the number of slices that are stored by a server. For example, with reference to FIG. 8, slice position 19 does not include any region of interest, so it remains unchanged by any remapping, such that (19,0), (19,1), (19,2), and (19,3) are identical. As a result, it may be beneficial to store only slice (19,0). Similarly, the slice in position 22 with ROI 1 highlighted remains unchanged if ROI 2 is also highlighted, so slice data (22,1) and (22,3) are identical, and the system may store only, e.g. slice data (22,1).

Data that associates remappings with different slices may take the form of the data in Tables 1-4.

TABLE 1

Slice data to use with no remapping.

| Slice Position | Slice Data to Use |
|---|---|
| 1 | (1, 0) |
| 2 | (2, 0) |
| ... | ... |
| 18 | (18, 0) |
| 19 | (19, 0) |
| ... | ... |
| 22 | (22, 0) |
| 23 | (23, 0) |
| ... | ... |

TABLE 2

Slice data to use with remapping of ROI 1 only.

| Slice Position | Slice Data to Use |
|---|---|
| 1 | (1, 0) |
| 2 | (2, 0) |
| ... | ... |
| 18 | (18, 1) |
| 19 | (19, 0) |
| ... | ... |
| 22 | (22, 1) |
| 23 | (23, 0) |
| ... | ... |

TABLE 3

Slice data to use with remapping of ROI 2 only.

| Slice Position | Slice Data to Use |
|---|---|
| 1 | (1, 0) |
| 2 | (2, 0) |
| ... | ... |
| 18 | (18, 0) |
| 19 | (19, 0) |
| ... | ... |
| 22 | (22, 0) |
| 23 | (23, 2) |
| ... | ... |

TABLE 4

Slice data to use with remapping of both ROI 1 and ROI 2.

| Slice Position | Slice Data to Use |
|---|---|
| 1 | (1, 0) |
| 2 | (2, 0) |
| ... | ... |
| 18 | (18, 1) |
| 19 | (19, 0) |
| ... | ... |
| 22 | (22, 1) |
| 23 | (23, 2) |
| ... | ... |

In step 916, when a client request for a particular tone remapping is received, the data that associates slices to remappings is used to reconstruct a full video frame in which the requested regions of interest are remapped. As illustrated in FIG. 9C, the requested slices are merged on the server side, and a full-frame video with the requested remapping or remappings is delivered to the client in step 918. In alternative embodiments, the separate slices are sent to the client, and the client assembles the slices into a full-frame video.

Video Delivery Method for Server-Side Remapping.

Figure 13:
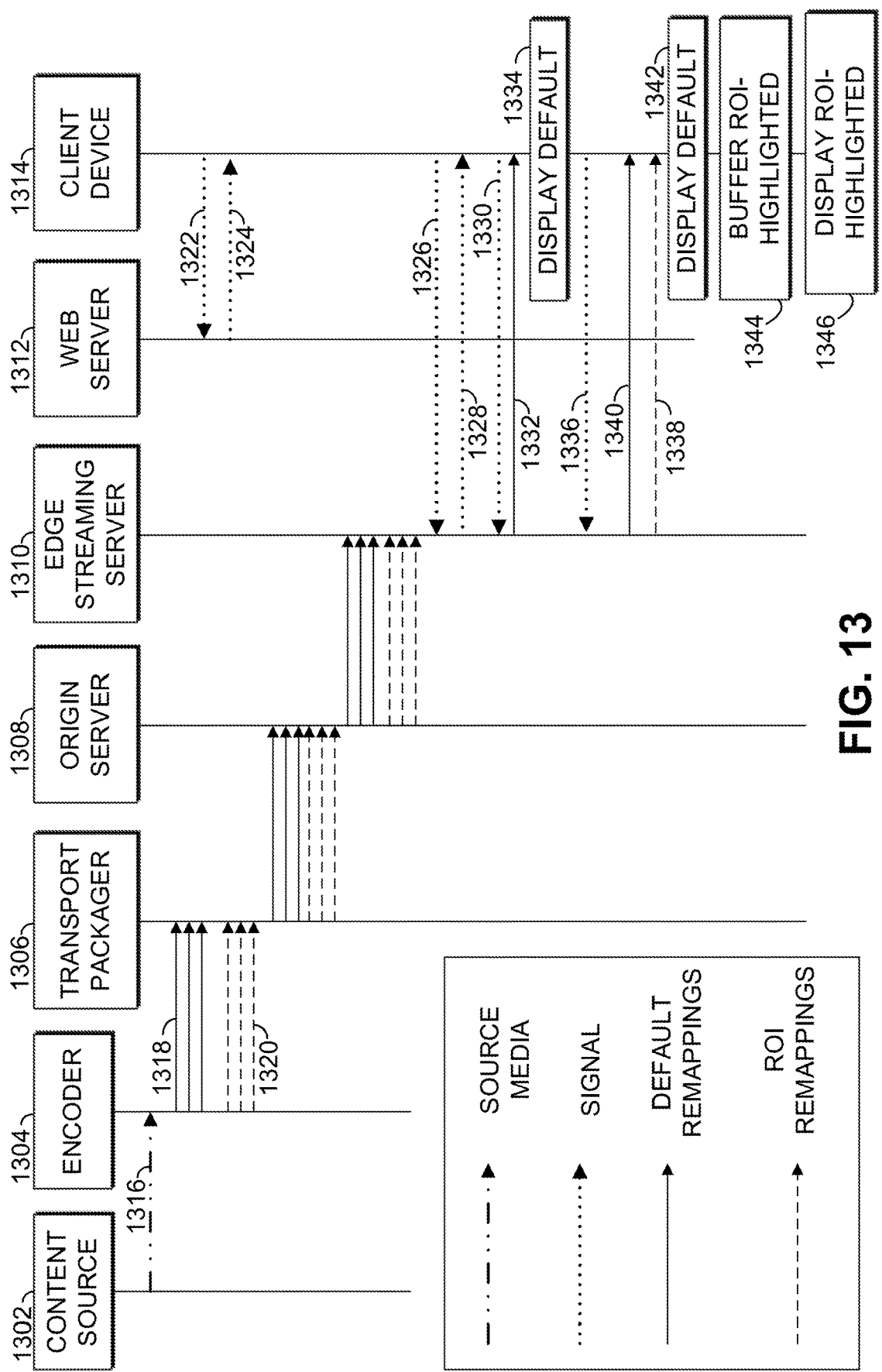
FIG. 13 is a message flow diagram illustrating configuration and operation of a system for delivery of alternative streams with region of interest highlighting.

FIG. 13 is a message flow diagram illustrating the operation of an exemplary video delivery system, depicting communications among a content source 1302, an encoder 1304, a transport packager 1306, an origin server 1308, an edge streaming server 1310, a web server 1312, and a client device.

The content source transmits a compressed or uncompressed media stream of the source media to an encoder at a high bit depth (1316). The encoder separately creates ABR streams with default tone mappings (1318) and ABR streams with alternative tone remappings in various regions of interest or combinations thereof (1320). (For a given tone mapping, the various ABR streams may represent different encoding points which may vary in properties such as bit rate and/or resolution). The various ABR streams with both the default tone mapping and alternative ROI tone mappings are transmitted to the transport packager 1306. The transport packager may segment the files and make the files available via an ftp or http download and prepare a manifest.

Figure 14:
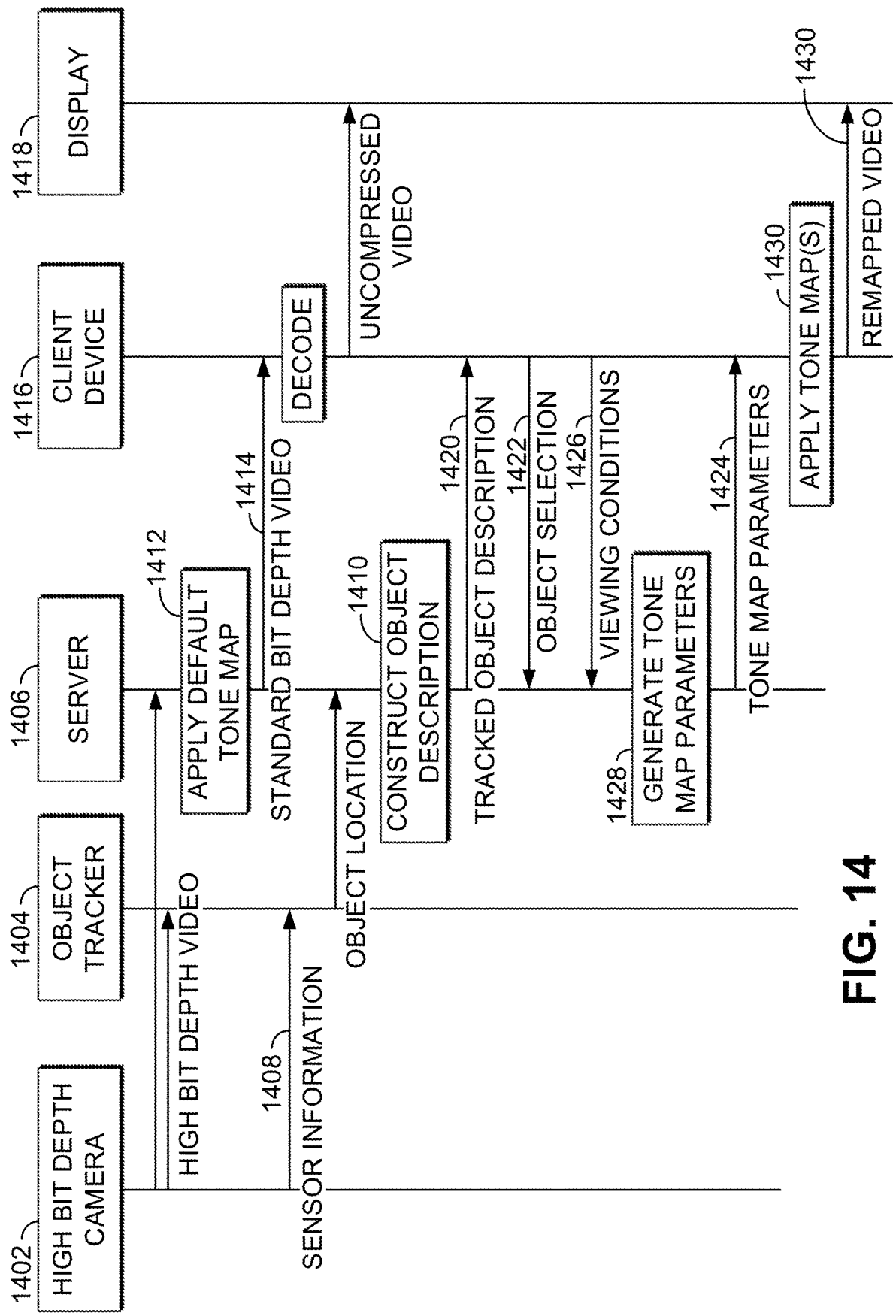
FIG. 14 is a message flow diagram illustrating configuration and operation of a system for delivery of video streams along with region of interest location and remapping information.

Note that the content preparation entities and steps shown in FIG. 14 are by way of example and should not be taken as limiting. Variations are possible, for example entities may be combined at the same location or into the same physical device. Also, the segmented media content may be delivered to an origin server (1308), to one or multiple edge streaming servers (1310), to a combination of these server types, or any suitable media server from which a media client may request the media content. A manifest file (e.g. a DASH MPD) that describes the media content may be prepared in advance and delivered to the streaming server (e.g. the origin server and/or the edge streaming server), or the manifest file may be generated dynamically in response to a client request for the manifest file.

A client device 1314 may transmit a signal (1322) to a web server 1312 requesting to download the media content and may receive a streaming server redirect signal (1324). The client device may request (1326) a manifest which describes the available content files (e.g. media segment files). The request may be sent from the client to a server. The server (e.g. origin server or an edge streaming server) may deliver the manifest file (1328) in response to the client request. The manifest may indicate availability of the various ABR streams with default tone maps and with alternative tone maps in regions of interest.

Initially, the client may request (1330) a default stream from a streaming server, and the streaming server may responsively transmit the default stream (e.g. media segments of that default stream) to the client device (1332). The client device may display the default stream (1334).

The client device may detect a cue to request an alternate representation of the content with highlighting in one or more regions of interest. For example, the cue may be user input wherein the user selects one or more regions of interest for highlighting. The cue may be detection by the client of a viewing condition or a change in viewing conditions for which the client has appropriate logic to convert a higher bit depth representation to a lower bit depth representation using a remapping appropriate for the current viewing conditions. In response to the client device detecting a cue to request a stream with an alternate tone mapping, the client device requests (1336) the appropriately remapped stream from the streaming server, and the streaming server responsively streams the requested stream (1338) to the client device.

The client device may continue to receive and display (1342) the default stream (1340) for a time period to allow additional buffering (1344) of the alternative stream to reduce playback latency. The alternative stream is displayed (1346) when a sufficient amount of the content is received and buffered at the client.

Video Delivery Method for Client-Side Remapping.

Figure 12:
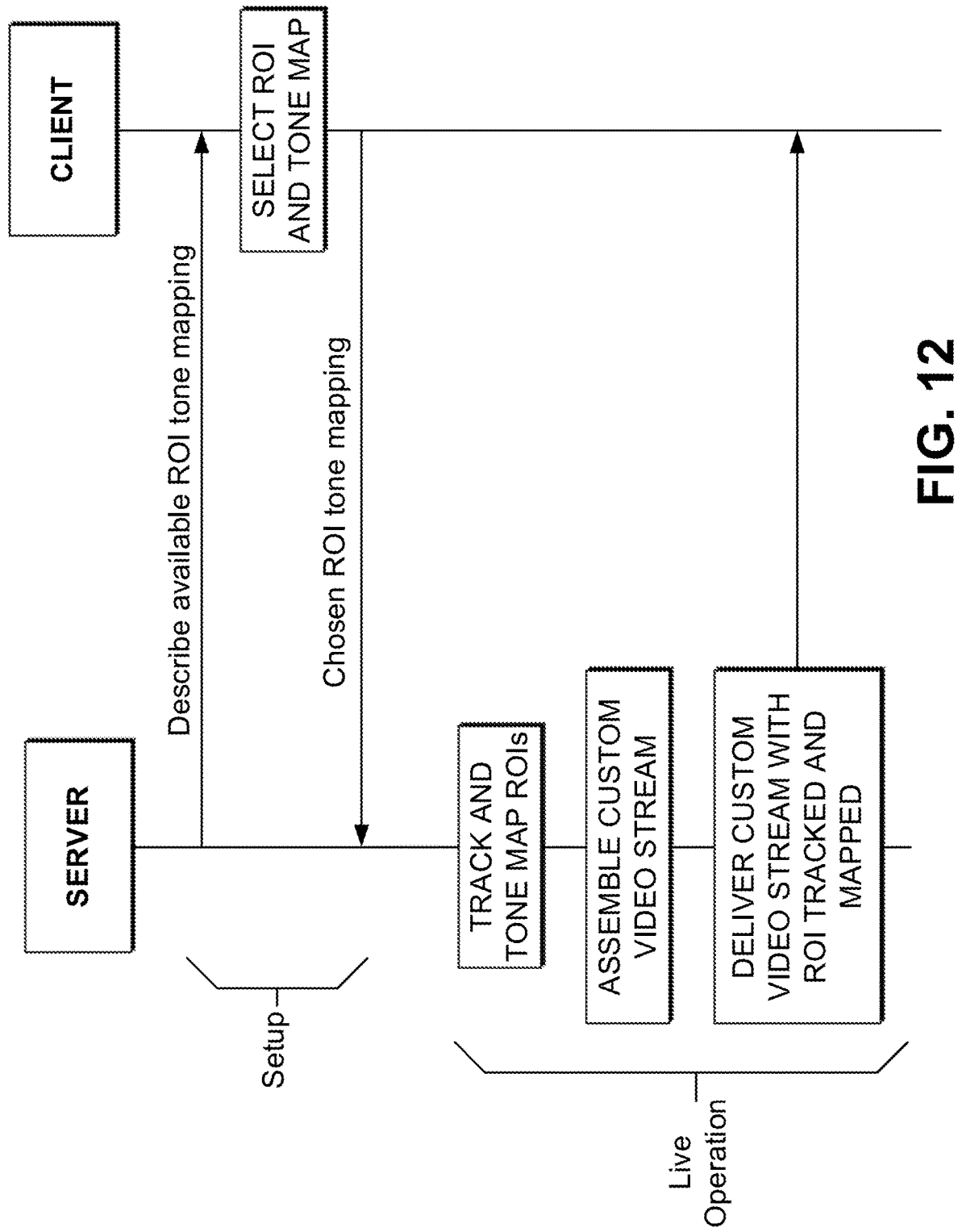
FIG. 12 is a message flow diagram illustrating configuration and operation of a system for delivery of alternative streams with region of interest highlighting.

In some embodiments, users are provided with the ability to select which type or type of remapping are to be applied to regions of interest selected by the user. For example, users with poor vision may select a tone remapping that leads to an exceptionally high luminance within the region of interest. While this may make particular details difficult to discern, it may be easier for such a user to track, e.g. a game ball as it moves across a playing field. Users with better vision may select a subtler highlighting effect. An overview of one such method for user configuration of a remapping is illustrated in FIG. 12. Greater detail is provided with respect to FIG. 14.

In the embodiment of FIG. 14, a high bit-depth camera 1402 or other video source provides a video signal to a server 1406 and to an object tracker 1404. The object tracker uses the video and, in some embodiments, additional sensor information 1408 (e.g. information indicating the direction toward which the camera is pointed, and/or information on the location of objects within the field of view of the camera) to identify the location of one or more regions and/or objects of interest within each frame of the video. The server constructs an object description 1410 for each object and/or region of interest. The description may include, for example, coordinates representing the location, size, and/or shape of the region of interest in each frame of video, and may further include metadata providing additional information about the region of interest (such as the name, jersey number, and position of an athlete within the region of interest).

A server receives the video and may, in some embodiments, apply a default tone map 1412 to the video. The default tone map may be a default bit map to map the source video from high bit depth to a standard bit depth (e.g. 8 bit) suitable for use by a display device. The standard bit depth video 1414 is delivered to a client device 1416 (e.g. through a content distribution network), which decodes the video and causes the video to be displayed on a display 1418 (e.g. by sending uncompressed video over an HDMI cable or other connection).

The server may embed the description 1420 of the objects of interest in-band in the video delivered to the client device (e.g. in the user data of the video frame within encoded media segments delivered to the client). The client device may, e.g. in response to user input, select one or more of the regions of interest. In some embodiments, the selection of a region of interest is conveyed by the client device to the server (1422). In such cases, the server may provide the client device with appropriate remapping parameters (1424) for the region of interest in response to the server receiving the client's region of interest selection information. In other embodiments, the client's selection is not conveyed to the server, and the server may provide the client device with appropriate remapping parameters (e.g. for each region of interest) regardless of whether any particular region of interest has been selected to undergo tone remapping. The client device may further convey information regarding viewing conditions (1426) and/or display device type at the client device. Different viewing conditions include the ambient lighting, such as a dark ambient light or a bright ambient light as detected by the client device. Different viewing device types may include a plasma display, an LCD display, an LED display, an OLED display, and the like, and different makes and models of those viewing devices.

Based on the viewing conditions at the client device, the server may generate tone mapping parameters (1428) that may be used by the client device for tone remapping of the region of interest. Various techniques may be used for selecting a suitable (e.g., optimal) tone remapping function for the pixel values in a region of interest. For example, a histogram may be generated from the pixel values which fall within a given region of interest, and a suitable (or optimal) conversion function may be generated based on the histogram and on ambient illumination conditions. Exemplary techniques that may be used for generation of a conversion function from histogram data for different levels of ambient illumination are described in, for example, R. Mantuik et al., *Display Adaptive Tone Mapping*, 27 (3) ACM TRANSACTIONS ON GRAPHICS (2008), which is incorporated herein by reference in its entirety. As described in Mantuik et al., the parameters of a tone map may be conveyed parametrically by a set of values $(x_i, d_i)$, although other sets of parameters may alternatively be used. In some embodiments, different parameters may be selected for different regions of interest. In other embodiments, a single set of parameters may be generated even when there is more than one region of interest. The tone mapping parameters may be generated and delivered on a frame-by-frame basis, or may be provided to cover a specific time interval spanning multiple frames. In some embodiments, the tone mapping parameters are generated in real time.

In some embodiments, the server generates a plurality of tone map parameter sets for each region of interest, with each parameter set being associated with a different viewing condition. The respective parameter sets may be tagged with information identifying each viewing condition. For example, a video stream may be accompanied by a plurality of parameter sets for a particular region of interest, with different parameter sets being tagged for use under different lighting conditions. In such embodiments, in response to a user selecting the region of interest for highlighting, the client device selects the parameter set associated with current local lighting conditions and applies the tone map defined by that parameter set to the selected region of interest. In such embodiments, the client device may not report the local viewing conditions to the server. In such embodiments, the server may apply the 'generate tone map parameters' step earlier than shown in FIG. 14, without waiting for the client to send information about viewing conditions or object selection.

The server delivers the generated tone mapping parameters to the client device (1424). The tone mapping parameters may be provided on a frame-by-frame basis and may be provided in-band (e.g. in the user data of the video frame within encoded media segments delivered to the client), or in a separate ROI metadata file retrievable by the client. Alternately the tone mapping parameters may be provided in a manifest file (e.g. a DASH MPD). The tone mapping parameters may be retrieved from the same server as the video stream (e.g. from a server in a content distribution network) or from a different server. In some embodiments, tone mapping parameters are updated less frequently than with every video frame. In some embodiments, the server generates and delivers to the client only tone mapping parameters for one or more regions of interest that the client has reported to the server as having been selected. In other embodiments, the client may not report to the server whether any particular region of interest has been selected, and the server may provide appropriate parameters for all regions of interest (even though some or all of those parameters may go unused by the client device). The client device receives the tone map parameters from the server and, if one or more regions of interest has been selected, applies the tone map to the appropriate region of interest (1430). The client device then causes the video (1432) with the remapped region (or regions) of interest to be displayed to the user.

Exemplary Client and Server Hardware.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions may take the form of or include hardware (i.e., hardwired) instructions, firmware instructions, software instructions, and/or the like, and may be stored in any suitable non-transitory computer-readable medium or media, such as commonly referred to as RAM, ROM, etc.

Exemplary embodiments disclosed herein are implemented using one or more wired and/or wireless network nodes, such as a wireless transmit/receive unit (WTRU) or other network entity.

Figure 15:
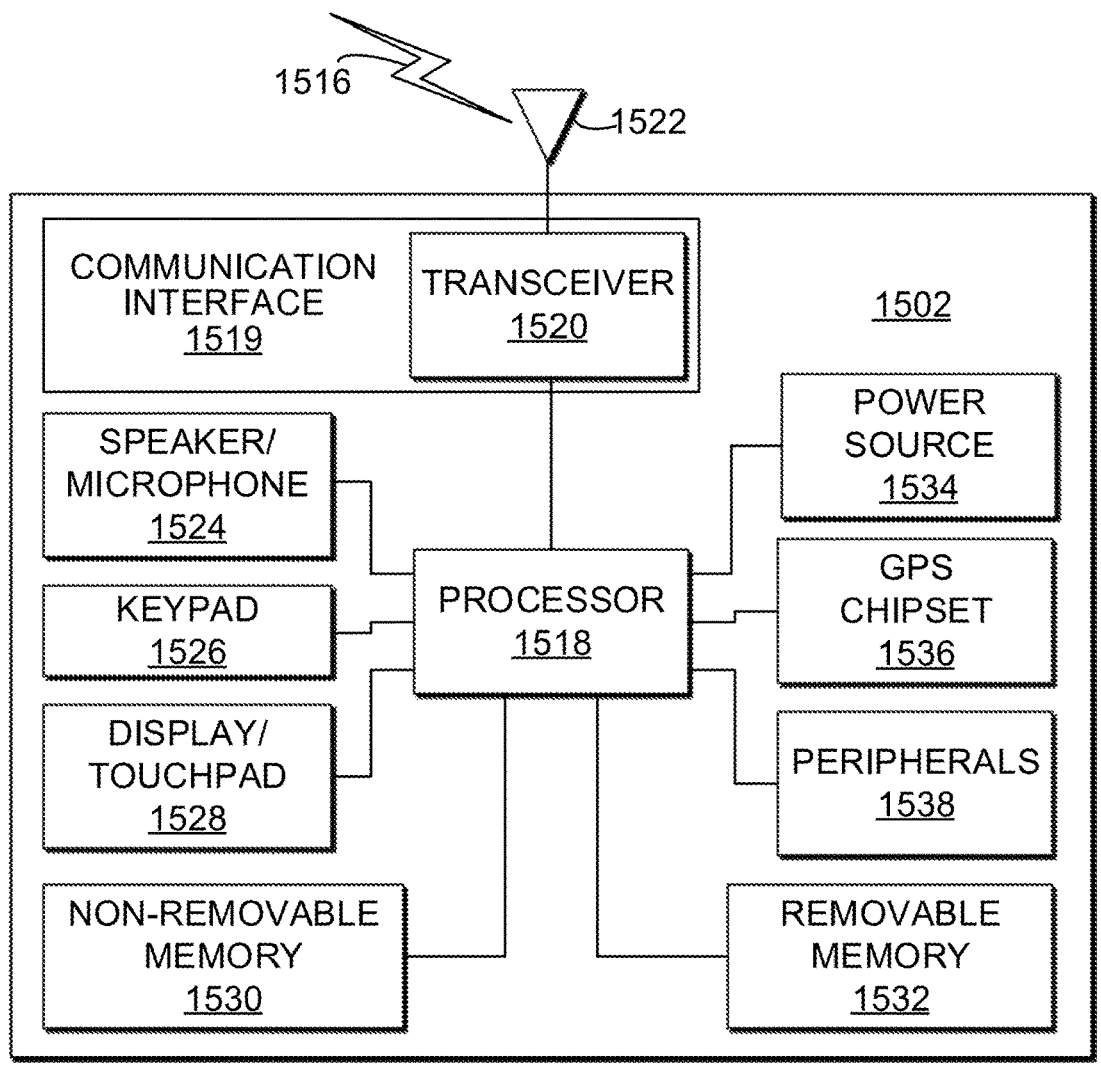
FIG. 15 is a functional block diagram of a client device that may be used in some embodiments.

FIG. 15 is a system diagram of an exemplary WTRU 1502, which may be employed as a client device or other component in embodiments described herein. As shown in FIG. 15, the WTRU 1502 may include a processor 1518, a communication interface 1519 including a transceiver 1520, a transmit/receive element 1522, a speaker/microphone 1524, a keypad 1526, a display/touchpad 1528, a non-removable memory 1530, a removable memory 1532, a power source 1534, a global positioning system (GPS) chipset 1536, and sensors 1538. It will be appreciated that the WTRU 1502 may include any sub-combination of the foregoing elements while remaining consistent with an embodiment.

The processor 1518 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1518 may perform signal coding, data processing, power control, input/output processing, and/or any other functionality that enables the WTRU 1502 to operate in a wireless environment. The processor 1518 may be coupled to the transceiver 1520, which may be coupled to the transmit/receive element 1522. While FIG. 15 depicts the processor 1518 and the transceiver 1520 as separate components, it will be appreciated that the processor 1518 and the transceiver 1520 may be integrated together in an electronic package or chip.

The transmit/receive element 1522 may be configured to transmit signals to, or receive signals from, a base station over the air interface 1516. For example, in one embodiment, the transmit/receive element 1522 may be an antenna configured to transmit and/or receive RF signals. In another embodiment, the transmit/receive element 1522 may be an emitter/detector configured to transmit and/or receive IR, UV, or visible light signals, as examples. In yet another embodiment, the transmit/receive element 1522 may be configured to transmit and receive both RF and light signals. It will be appreciated that the transmit/receive element 1522 may be configured to transmit and/or receive any combination of wireless signals.

In addition, although the transmit/receive element 1522 is depicted in FIG. 15 as a single element, the WTRU 1502 may include any number of transmit/receive elements 1522. More specifically, the WTRU 1502 may employ MIMO technology. Thus, in one embodiment, the WTRU 1502 may include two or more transmit/receive elements 1522 (e.g., multiple antennas) for transmitting and receiving wireless signals over the air interface 1516.

The transceiver 1520 may be configured to modulate the signals that are to be transmitted by the transmit/receive element 1522 and to demodulate the signals that are received by the transmit/receive element 1522. As noted above, the WTRU 1502 may have multi-mode capabilities. Thus, the transceiver 1520 may include multiple transceivers for enabling the WTRU 1502 to communicate via multiple RATs, such as UTRA and IEEE 802.11, as examples.

The processor 1518 of the WTRU 1502 may be coupled to, and may receive user input data from, the speaker/microphone 1524, the keypad 1526, and/or the display/touchpad 1528 (e.g., a liquid crystal display (LCD) display unit or organic light-emitting diode (OLED) display unit). The processor 1518 may also output user data to the speaker/microphone 1524, the keypad 1526, and/or the display/touchpad 1528. In addition, the processor 1518 may access information from, and store data in, any type of suitable memory, such as the non-removable memory 1530 and/or the removable memory 1532. The non-removable memory 1530 may include random-access memory (RAM), read-only memory (ROM), a hard disk, or any other type of memory storage device. The removable memory 1532 may include a subscriber identity module (SIM) card, a memory stick, a secure digital (SD) memory card, and the like. In other embodiments, the processor 1518 may access information from, and store data in, memory that is not physically located on the WTRU 1502, such as on a server or a home computer (not shown).

The processor 1518 may receive power from the power source 1534, and may be configured to distribute and/or control the power to the other components in the WTRU 1502. The power source 1534 may be any suitable device for powering the WTRU 1502. As examples, the power source 1534 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 1518 may also be coupled to the GPS chipset 1536, which may be configured to provide location information (e.g., longitude and latitude) regarding the current location of the WTRU 1502. In addition to, or in lieu of, the information from the GPS chipset 1536, the WTRU 1502 may receive location information over the air interface 1516 from a base station and/or determine its location based on the timing of the signals being received from two or more nearby base stations. It will be appreciated that the WTRU 1502 may acquire location information by way of any suitable location-determination method while remaining consistent with an embodiment.

The processor 1518 may further be coupled to other peripherals 1538, which may include one or more software and/or hardware modules that provide additional features, functionality and/or wired or wireless connectivity. For example, the peripherals 1538 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 16:
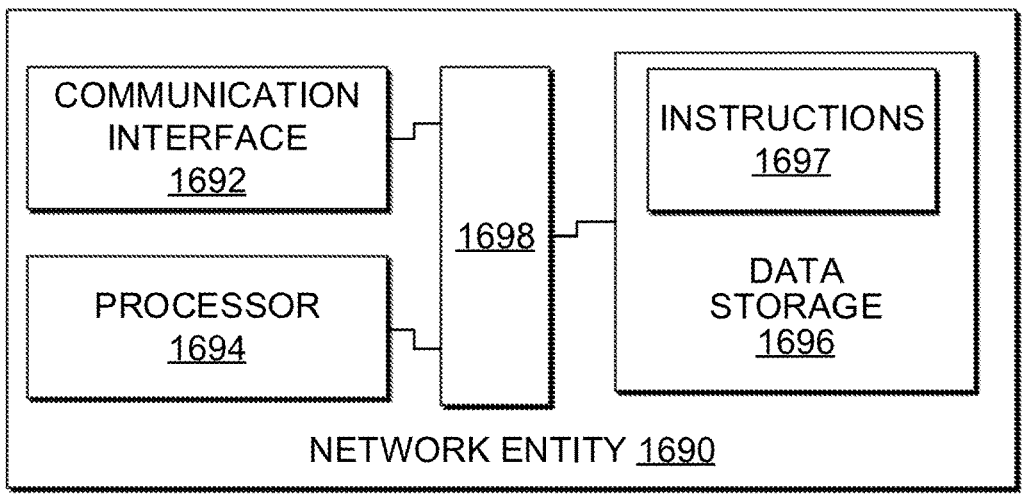
FIG. 16 is a functional block diagram of a network entity that may be used in some embodiments.

FIG. 16 depicts an exemplary network entity 1690 that may be used in embodiments of the present disclosure, for example as an encoder, transport packager, origin server, edge streaming server, web server, or client device as described herein. As depicted in FIG. 6, network entity 1690 includes a communication interface 1692, a processor 1694, and non-transitory data storage 1696, all of which are communicatively linked by a bus, network, or other communication path 1698.

Communication interface 1692 may include one or more wired communication interfaces and/or one or more wireless-communication interfaces. With respect to wired communication, communication interface 1692 may include one or more interfaces such as Ethernet interfaces, as an example. With respect to wireless communication, communication interface 1692 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 1692 may be equipped at a scale and with a configuration appropriate for acting on the network side—as opposed to the client side—of wireless communications (e.g., LTE communications, Wi-Fi communications, and the like). Thus, communication interface 1692 may include the appropriate equipment and circuitry (perhaps including multiple transceivers) for serving multiple mobile stations, UEs, or other access terminals in a coverage area.

Processor 1694 may include one or more processors of any type deemed suitable by those of skill in the relevant art, some examples including a general-purpose microprocessor and a dedicated DSP.

Data storage 1696 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 16, data storage 1696 contains program instructions 1697 executable by processor 1694 for carrying out various combinations of the various network-entity functions described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

We claim:

1. A method comprising:
    at a client device, receiving: (i) first video stream data comprising video content, (ii) information identifying at least a first region of interest in the video content, and (iii) at least a first parameter set defining at least a first tone map associated with at least the first region of interest;
    in response to user selection of at least the first region of interest, applying the first tone map to at least the first region of interest to generate modified video content by mapping input sample values of pixels in the first region of interest to corresponding output sample values; and
    causing display of the modified video content.

2. The method of claim 1, further comprising: at the client device, further receiving information identifying a second region of interest; and
    wherein, in response to user selection of the first region of interest and the second region of interest, the first tone map is applied to the first region of interest and the second region of interest to generate the modified video content.

3. The method of claim 1, further comprising: at the client device, further receiving (i) information identifying a second region of interest and (ii) at least a second parameter set defining at least a second tone map associated with at least the second region of interest; and
    wherein, in response to user selection of the first region of interest and the second region of interest, the first tone map is applied to the first region of interest and the second tone map is applied to the second region of interest to generate the modified video content.

4. The method of claim 1, wherein the first tone map is not applied to portions of the video content outside the first region of interest.

5. The method of claim 2, wherein the first tone map is not applied to portions of the video content outside the first region of interest and the second region of interest.

6. The method of claim 3, wherein the first tone map is not applied to portions of the video content outside the first region of interest and the second tone map is not applied to portions of the video content outside the second region of interest.

7. The method of claim 1, wherein the information identifying the first region of interest includes coordinates of the first region of interest.

8. The method of claim 1, wherein the information identifying the first region of interest is provided in-band in the video content.

9. The method of claim 1, wherein the information identifying the first region of interest is provided in supplemental enhancement information (SEI) messages in the video content.

10. The method of claim 1, wherein a location of the first region of interest changes on a frame-by-frame basis.

11. The method of claim 1, wherein at least the first parameter set is received in a manifest.

12. The method of claim 1, wherein the first parameter set is a gamma correction.

13. The method of claim 1, wherein at least the first tone map is a sigmoidal mapping.

14. A method comprising:
    at a client device, receiving: (i) video stream data comprising video content, and (ii) a plurality of parameter sets, each parameter set defining a respective tone map;
    determining a viewing parameter at the client device;
    selecting at least one of the plurality of parameter sets based at least in part on the determined viewing parameter, the selected parameter set defining a selected tone map;
    applying the selected tone map to at least a portion of the video content to generate modified video content by mapping input sample values of pixels in the video content to corresponding output sample values; and
    causing display of the modified video content.

15. The method of claim 14, wherein the viewing parameter is a display device type.

16. The method of claim 14, wherein the viewing parameter is an ambient illumination level.

17. The method of claim 14, further comprising:
    at the client device, further receiving information identifying at least a first region of interest in the video content, and
    wherein the selected tone map is applied only to the region of interest.

18. The method of claim 14, wherein the plurality of parameter sets are received in a manifest.

19. A method comprising:
    determining a viewing parameter at a client device;
    sending the viewing parameter to a video server;

receiving, from the server: (i) first video stream data comprising video content, and (ii) a parameter set defining a respective tone map, the parameter set being determined based at least in part on the viewing parameter;

applying the tone map to at least a portion of the video content to generate modified video content by mapping input sample values of pixels in the video content to corresponding output sample values; and causing display of the modified video content.

20. The method of claim 19, wherein the viewing parameter is a display device type or an ambient illumination level.

* * * * *